(12) United States Patent
Kondo et al.

(10) Patent No.: US 12,533,350 B2
(45) Date of Patent: Jan. 27, 2026

(54) USE OF MELANOCORTIN-1 RECEPTOR AGONIST

(71) Applicant: TANABE PHARMA CORPORATION, Osaka (JP)

(72) Inventors: Masahiro Kondo, Osaka (JP); Tsuyoshi Suzuki, Osaka (JP); Yuko Kawano, Osaka (JP)

(73) Assignee: Tanabe Pharma Corporation, Osaka (JP)

( * ) Notice: Subject to any disclaimer, the term of this patent is extended or adjusted under 35 U.S.C. 154(b) by 0 days.

(21) Appl. No.: 19/013,174

(22) Filed: Jan. 8, 2025

(65) Prior Publication Data

US 2025/0134879 A1     May 1, 2025

Related U.S. Application Data

(63) Continuation of application No. 18/834,394, filed as application No. PCT/JP2023/003001 on Jan. 31, 2023.

(30) Foreign Application Priority Data

Jan. 31, 2022   (JP) ................... 2022-013759

(51) Int. Cl.
*A61K 31/454*     (2006.01)

(52) U.S. Cl.
CPC ................... *A61K 31/454* (2013.01)

(58) Field of Classification Search
CPC ................................................. A61K 31/454
See application file for complete search history.

(56) References Cited

U.S. PATENT DOCUMENTS

| | | | |
|---|---|---|---|
| 9,981,960 B2 * | 5/2018 | Yamamoto | ........... C07D 401/06 |
| 2017/0190697 A1 | 7/2017 | Yamamoto et al. | |
| 2022/0073497 A1 | 3/2022 | Ueda et al. | |
| 2023/0226034 A1 | 7/2023 | Suzuki et al. | |
| 2023/0382895 A1 | 11/2023 | Ham et al. | |
| 2024/0091235 A1 | 3/2024 | Park et al. | |

FOREIGN PATENT DOCUMENTS

| | | |
|---|---|---|
| EP | 2585089 B1 | 10/2016 |
| TW | 202225161 A | 7/2022 |
| TW | 202233610 A | 9/2022 |
| WO | WO 2015/182723 A1 | 12/2015 |
| WO | WO 2020/138481 A1 | 7/2020 |
| WO | WO 2021/251452 A1 | 12/2021 |

OTHER PUBLICATIONS

International Search Report issued Apr. 25, 2023 in PCT/JP2023/003001 filed Jan. 31, 2023, 4 pages.
Dinparastisaleh et al., "Antifibrotic and Anti-Inflammatory Actions of α-Melanocytic Hormone: New Roles for an Old Player", Pharmaceuticals, 2021, 14, 45, pp. 1-20.
Kokot et al., "α-Melanocyte-Stimulating Hormone Suppresses Bleomycin-Induced Collagen Synthesis and Reduces Tissue Fibrosis in a Mouse Model of Scleroderma—Melanocortin Peptides as a Novel Treatment Strategy for Scleroderma?", Arthritis Rheum., 2009, vol. 60, No. 2, pp. 592-603.
Colombo et al., "Production and Effects of a-Melanocyte-Stimulating Hormone During Acute Lung Injury", Shock, 2007, vol. 27, No. 3, pp. 326-333.
Suzuka et al., "Intravenous administration of adipose tissue-derived stem cells suppresses skin inflammation and fibrosis in mice with pleomycin-induced skin sclerosis", Programs and Abstracts of 17th Congress of the Japanese Society for Regenerative Medicine, Oral Speech, 2018, 2 pages (with English translation).
Kondo et al., "Dersimelagon, a novel oral melanocortin 1 receptor agonist, demonstrates disease-modifying effects in preclinical models of systemic sclerosis", Arthritis Research & Therapy, 2022, vol. 24, Article No. 210, pp. 1-17.
Kondo et al., "Dersimelagon, a novel oral melanocortin 1 receptor agonist, demonstrates disease-modifying effects in preclinical models of systemic sclerosis", Annals of the Rheumatic Diseases, POS0467, 2022, 81, p. 488.
Böhm et al., "Bleomycin-induced fibrosis in MC; signalling-deficient C57BL/6JMc1r$^{e/e}$ mice further supports a modulating role for melanocortins in collagen synthesis of the skin", Experimental Dermatology, 2014, 23, pp. 431-433.
AVDEEV (2015) "Idiopathic Pulmonary Fibrosis", Federal Pulmonology Research Institute, 25(5): 600-612.
Galimova et al., (2016) "The First Type Melanocortin Receptor MC1R as a Genetic Marker for the Development of Psoriasis", Russian Journal of Skin and Venereal Diseases, 19(3): 173.
Kharkevich (2010) "Routes of Administration of Medicinal Substances. Absorption", 10th edition. M.: GEOTAR-Media, p. 42 and pp. 73-74.
Konorev et al. (2012) Clinical Pharmacology: A Manual for 6th Year Students of the Medical Faculty, Vitebsk: VSMU, pp. 1-235.
Mashkovsky (2002) Handbook for Physicians, 14th Edition, vol. 1, pp. 8-9.
Office Action dated Jul. 10, 2025 issued in the corresponding Russian application No. 2024125450 with English Translation (29 pages).
European Lung Foundation (2021) Interstitial lung disease (ILD), Url: https://europeanlung.org/ru/information-hub/lung-conditions/%d0%b8%d0%bd%d1%82%d0%b5%d1%80%d1%81%d1%82%d0%b8%d 1%86%d0%b8%do %b0%d0%bb%d1%80%d0%bd%d0%be%d0%b5-%d0%b7%d0%b0%d0%b1%d0%be%d0%bb%d0%b5%D0%b2%d0%b0%d0%bd%d0%b8%d0%b5-%d0%bb%d0%b5%d0%b3%d0%ba%d0%b8%d1%85/ (9 pages).

(Continued)

*Primary Examiner* — James D. Anderson
(74) *Attorney, Agent, or Firm* — Finnegan, Henderson, Farabow, Garrett & Dunner, LLP

(57) ABSTRACT

A medicament for treatment or prevention of interstitial lung disease, and of a disease or symptom accompanied by systemic sclerosis in a subject includes, as an effective ingredient, 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof.

20 Claims, 11 Drawing Sheets

Specification includes a Sequence Listing.

(56) References Cited

OTHER PUBLICATIONS

Extended European Search Report issued in European Application No. 23747169.3, dated Sep. 9, 2025 (11 pages).
Roofeh et al., (2020) "Emerging drugs for the treatment of scleroderma: A review of recent phase 2 and 3 trials", Expert Opinion On Emerging Drugs, 25(4): 455-466.
Zhao et al., (2022) "Clinical Treatment Options in Scleroderma: Recommendations and Comprehensive Review", Clinical Reviews in Allergy & IMMUNOLOGY, 62(2): 273-291.

* cited by examiner

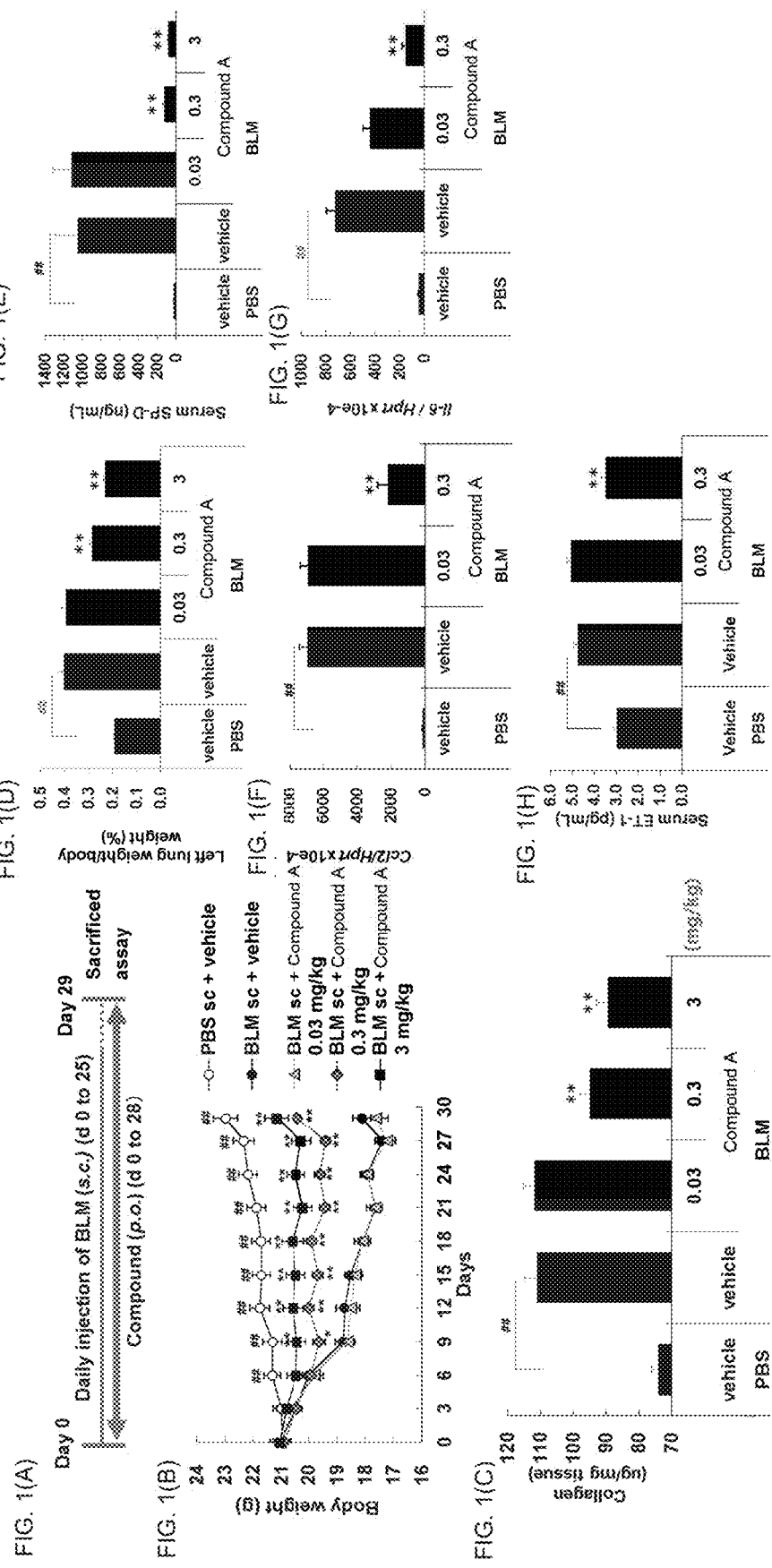

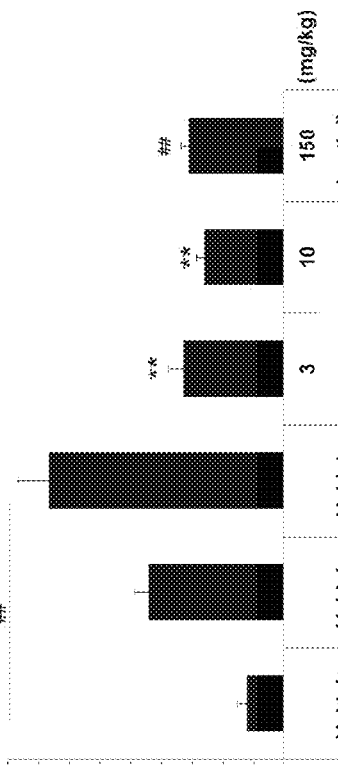
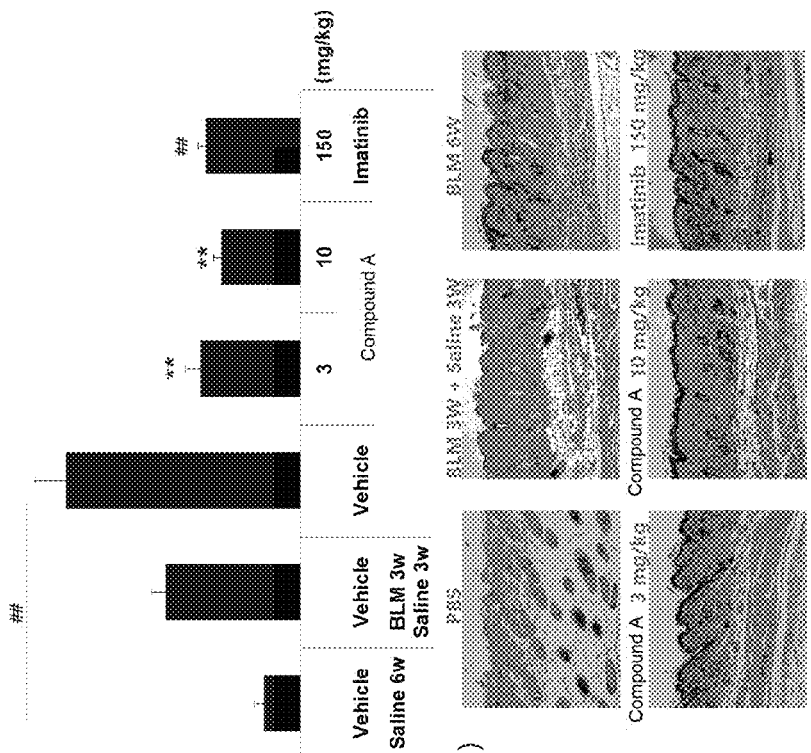
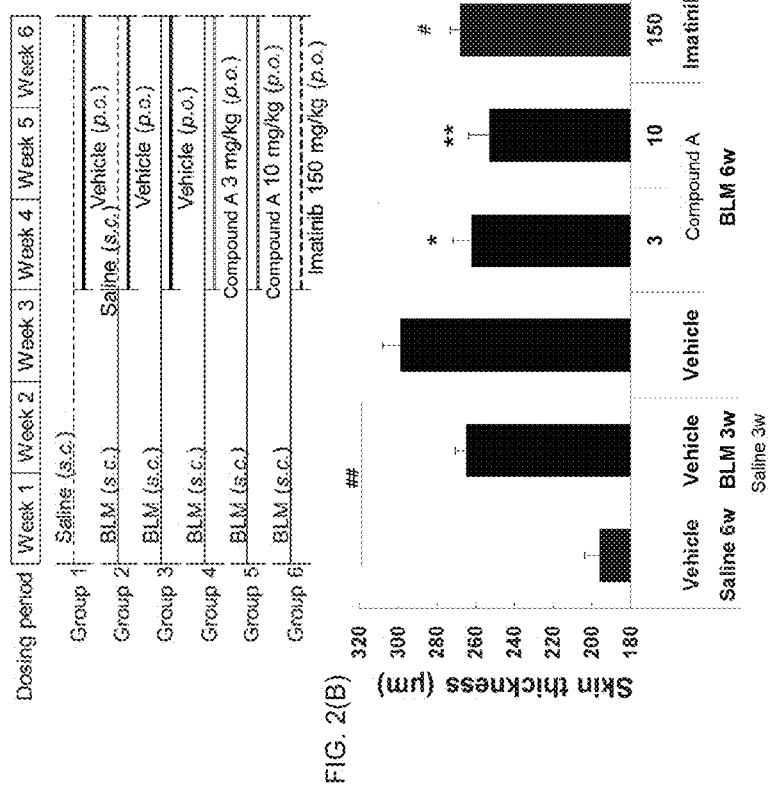
FIG. 2(A)
FIG. 2(B)
FIG. 2(C)
FIG. 2(D)

Fig. 3F
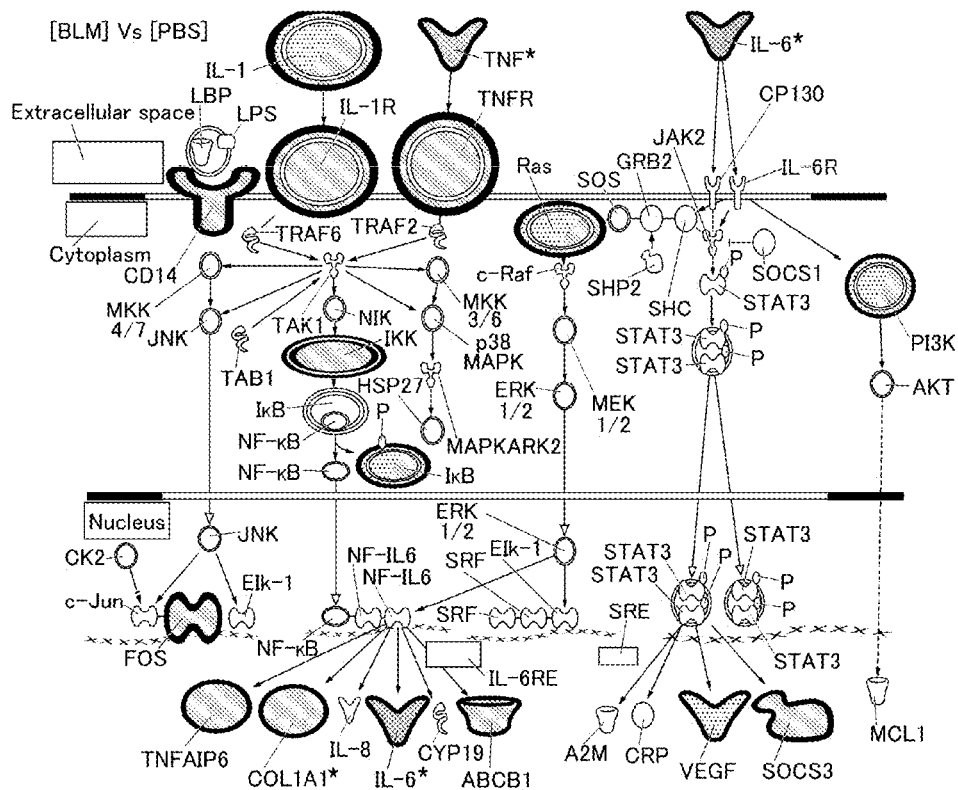
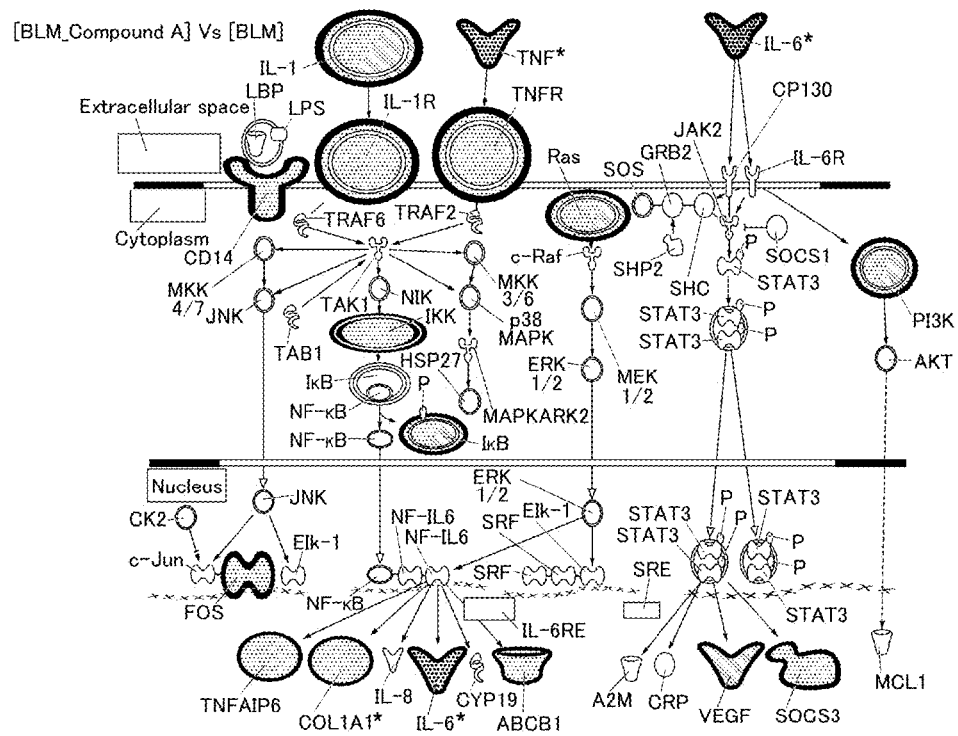

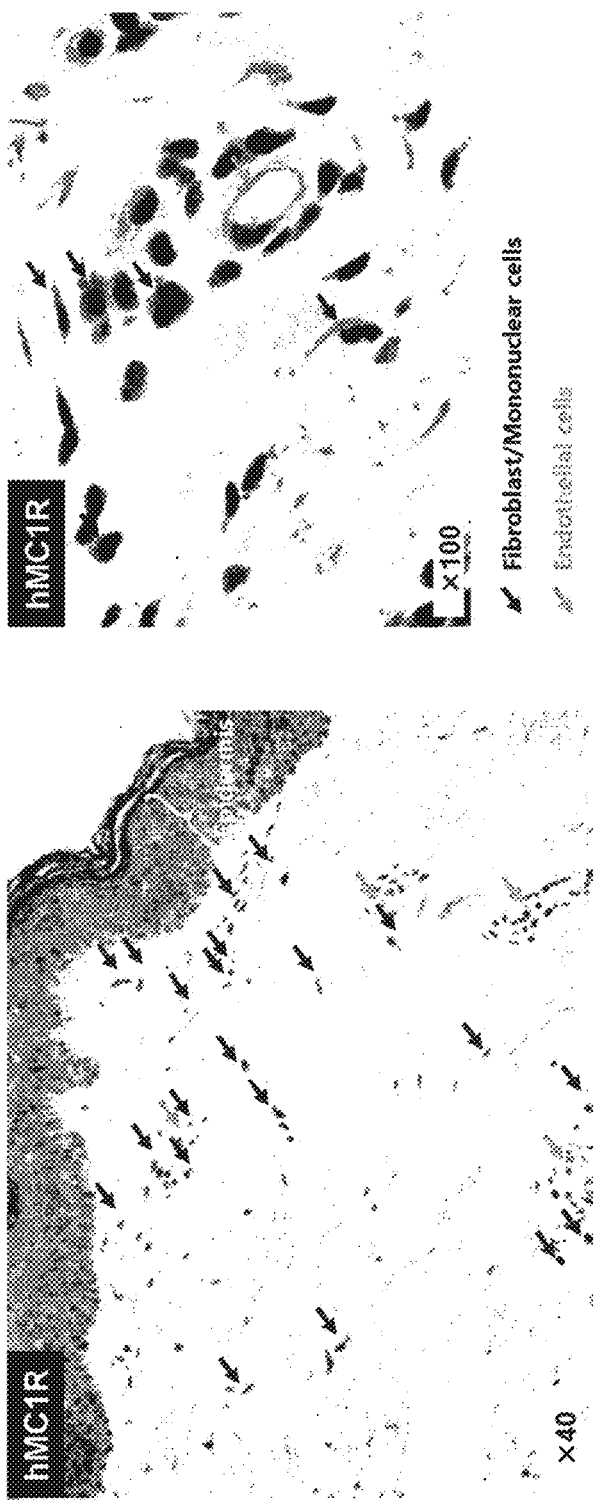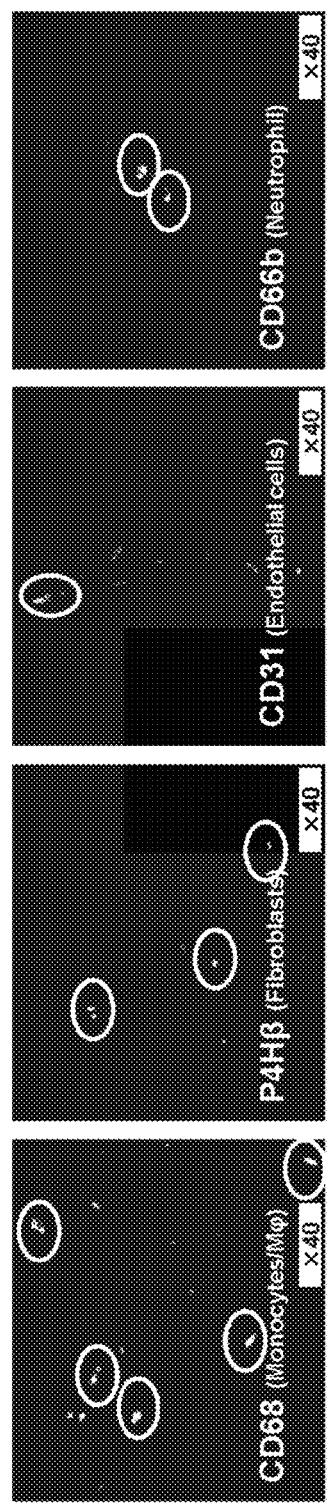
FIG. 6(A)
FIG. 6(B)

USE OF MELANOCORTIN-1 RECEPTOR AGONIST

CROSS-REFERENCE TO RELATED APPLICATIONS

This application is a continuation of U.S. patent application of Ser. No. 18/834,394, filed Jul. 30, 2024, which is a National Stage Application of International Application No. PCT/JP2023/003001, filed Jan. 31, 2023, which is based upon and claims the benefit of priority to Japanese Patent Application No. 2022-013759, filed Jan. 31, 2022. The entire contents of these applications are incorporated herein by reference.

REFERENCE TO A SEQUENCE LISTING

In accordance with 37 CFR § 1.831-1835 and 37 CFR § 1.77(b)(5), the specification makes reference to a Sequence Listing submitted electronically as a .xml file named "556014US_ST26.xml". This .xml file was generated on Jan. 2, 2025 and is 8,669 bytes in size. The entire contents of the Sequence Listing are hereby incorporated by reference.

BACKGROUND OF THE INVENTION

Field of the Invention

The present invention relates to a medicament for treatment or prevention of interstitial lung disease, and of a disease or symptom accompanied by systemic sclerosis, selected from skin fibrosis, flexion contracture, gastroesophageal reflux disease, dysphagia, Raynaud phenomenon, digital ulcers, pulmonary hypertension, and renal crisis.

Description of the Related Art

WO 2015/182723 describes that pyrrolidine compounds, and pharmaceutically acceptable salts, solvates/hydrates, and co-crystals thereof have MCR-activating action. WO 2015/182723 describes that a co-crystal of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid and phosphoric acid has MCR-activating action.

SUMMARY OF THE INVENTION

According to one aspect of the present invention, a method for treating or preventing systemic sclerosis-associated interstitial lung disease includes administering an effective amount of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid (hereinafter referred to as "Compound A"), or a pharmaceutically acceptable salt or co-crystal thereof to a subject in need thereof.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1(A)-1(H) show the effect of Compound A on skin fibrosis and lung inflammation in a bleomycin (BLM)-induced systemic sclerosis (SSc) model: prevention evaluation;

FIGS. 29(A)-2(D) show the effect of Compound A on skin fibrosis in a BLM-induced SSc model: treatment evaluation;

FIG. 3F shows gene expression profiling of lung tissues of BLM-induced SSc model animals to which Compound A or a pharmaceutically acceptable salt or co-crystal thereof was administered, which profiling was carried out using a microarray;

FIGS. 6(A) and 6(B) show analysis (photographs) of MC1R in skin biopsy samples from SSc patients, which analysis was carried out by immunohistochemical staining. Representative images by immunohistochemical staining of skin biopsy samples from patients with dcSSc (diffuse cutaneous systemic sclerosis)

DETAILED DESCRIPTION OF THE EMBODIMENTS

Figure 3A:
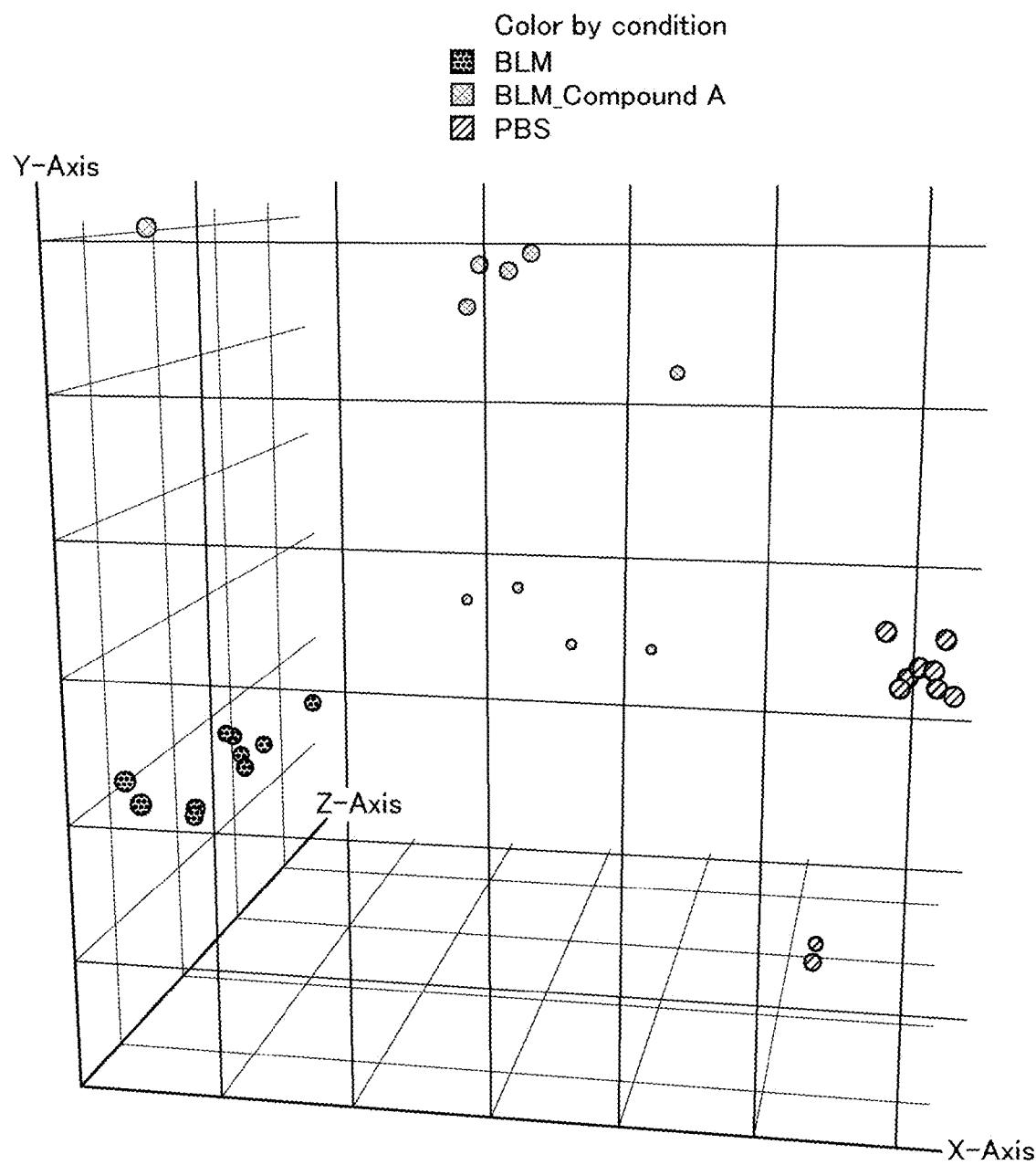
FIG. 3A shows gene expression profiling of lung tissues of BLM-induced SSc model animals to which Compound A or a pharmaceutically acceptable salt or co-crystal thereof was administered, which profiling was carried out using a microarray.

Embodiments will now be described with reference to the accompanying drawings, wherein like reference numerals designate corresponding or identical elements throughout the various drawings.

Medicament

A medicament for treatment or prevention of interstitial lung disease according to a first aspect of the present invention includes 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof as an effective ingredient.

A medicament for treatment or prevention of a disease or symptom accompanied by systemic sclerosis according to a second aspect of the present invention includes Compound A, or a pharmaceutically acceptable salt or co-crystal thereof as an effective ingredient. The disease or symptom is skin fibrosis, flexion contracture, gastroesophageal reflux disease, dysphagia, Raynaud phenomenon, digital ulcers, pulmonary hypertension, or renal crisis.

In the present specification, "prevention" means an act of administering a medicament according to an embodiment of the present invention to an individual who has not developed a disease, disorder, or symptom, to prevent the development. The "treatment" means an act of administering a medicament according to an embodiment of the present invention to an individual who has already developed a disease, disorder, or symptom, to ameliorate and/or eliminate the symptom. Accordingly, an act of administering the medicament to an individual who has already developed a disease, disorder, or symptom, in order to prevent exacerbation, attacks, or recurrence of the symptom or the like is one aspect of the "treatment".

Effective Ingredient

Compound A, or a pharmaceutically acceptable salt or co-crystal thereof is described in WO 2015/182723 and may be produced by a method described in WO 2015/182723.

Compound A may be provided for pharmaceutical uses either in the free form, or in the form of a pharmaceutically acceptable salt or a co-crystal, and Compound A, or a pharmaceutically acceptable salt or co-crystal thereof includes any of intramolecular salts and adducts, and solvates, hydrates, crystalline polymorphs, and the like thereof.

Examples of the pharmaceutically acceptable salts, co-crystals, intramolecular salts, adducts, and the like herein include those containing: an inorganic acid such as hydrochloric acid, sulfuric acid, phosphoric acid, or hydrobromic acid; an organic acid such as acetic acid, fumaric acid, oxalic acid, citric acid, methanesulfonic acid, benzenesulfonic acid, tosic acid, or maleic acid; or the like. It is more preferred to use a co-crystal of Compound A and phosphoric acid.

Interstitial Lung Disease

A target disease of a medicament according to the first aspect of the present invention is interstitial lung disease.

Examples of the interstitial lung disease include interstitial pneumonia, and examples of the interstitial pneumonia include idiopathic interstitial pneumonia, in particular, idiopathic interstitial pneumonia accompanied by idiopathic pulmonary fibrosis. Examples of the interstitial lung disease also include connective tissue disease-associated interstitial lung disease, and systemic sclerosis-associated interstitial lung disease.

The interstitial lung disease is preferably interstitial lung disease accompanied by an increase in at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA. The expression levels of these markers are preferably increased (for example, not less than 1.5-fold, not less than 1.8-fold, or not less than 2-fold) compared to the expression levels in a healthy individual.

The interstitial lung disease may be interstitial lung disease that occurs in patients with systemic sclerosis.

Examples of the systemic sclerosis include limited cutaneous systemic sclerosis and diffuse cutaneous systemic sclerosis.

Disease or Symptom Accompanied by Systemic Sclerosis

A disease or symptom to be targeted by a medicament according to the second aspect of the present invention is a disease or symptom selected from skin fibrosis, flexion contracture, gastroesophageal reflux disease, dysphagia, Raynaud phenomenon, digital ulcers, pulmonary hypertension, and renal crisis accompanied by systemic sclerosis. The flexion contracture is a symptom that occurs due to skin fibrosis in systemic sclerosis, and can be ameliorated by suppressing the skin fibrosis. The gastroesophageal reflux disease and dysphagia are symptoms that occur due to esophageal fibrosis in systemic sclerosis, and can be ameliorated by suppressing the esophageal fibrosis. The Raynaud phenomenon, digital ulcers, pulmonary hypertension, and renal crisis are symptoms that occur due to vascular dysfunction in systemic sclerosis, and can be ameliorated by suppressing the vascular dysfunction. Examples of the pulmonary hypertension include, but are not limited to, pulmonary arterial hypertension. Examples of the systemic sclerosis include limited cutaneous systemic sclerosis and diffuse cutaneous systemic sclerosis.

The disease or symptom accompanied by systemic sclerosis described above is preferably accompanied by an increase in at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA. The expression levels of these markers are preferably increased (for example, not less than 1.5-fold, not less than 1.8-fold, or not less than 2-fold) compared to the expression levels in a healthy individual.

Medicament for Lowering Disease Markers

A medicament for decreasing the expression level of at least one selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA in a subject according to another aspect of the present invention includes Compound A, or a pharmaceutically acceptable salt or co-crystal thereof as an effective ingredient.

In other words, Compound A, or a pharmaceutically acceptable salt or co-crystal thereof is used as a therapeutic agent or prophylactic agent for a disease or symptom that can be treated or prevented by decreasing the expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA. The decrease herein may be a significant decrease relative to the expression level before the administration of Compound A, or a pharmaceutically acceptable salt or co-crystal thereof, and the decrease preferably occurs to an extent at which the difference between the expression level after the administration and the normal value is not more than 50%, not more than 40%, or not more than 20% that of the difference between the expression level before the administration and the normal value. The expression level may decrease to not more than the detection limit.

The disease or symptom is not limited as long as it is a disease or symptom in which the expression level of at least one of these markers is increased relative to that in a healthy individual, and which can be treated or prevented by decreasing the expression level.

P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA are markers of inflammatory diseases, fibrosis, and vascular dysfunction. Examples of diseases and symptoms that can be treated or prevented by decreasing the expression level of at least one of these include inflammatory diseases, fibrosis, and vascular dysfunction, and symptoms caused by these. Specific examples of the diseases and symptoms include the above-described interstitial lung disease (including idiopathic interstitial pneumonia, or connective tissue disease-associated interstitial lung disease); and diseases and symptoms such as skin fibrosis, flexion contracture, gastroesophageal reflux disease, dysphagia, Raynaud phenomenon, digital ulcers, pulmonary hypertension, and renal crisis. More preferred examples of the diseases and symptoms include interstitial lung disease, skin fibrosis, flexion contracture, gastroesophageal reflux disease, dysphagia, Raynaud phenomenon, digital ulcers, pulmonary hypertension, and renal crisis accompanied by scleroderma. The diseases and symptoms are not limited to those described above as long as they are diseases showing an increase in the expression of at least one selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA compared to the expression in a healthy individual, and as long as the diseases can be treated or prevented by decreasing, in other words, normalizing, the expression.

The expression level may be the level of either mRNA expression or protein expression.

The mRNA expression level can be quantified by, for example, RT-PCR.

Regarding the protein expression level, for example, the expression level in a tissue can be specified by staining using an antibody or the like, and the expression level in a body fluid such as blood can be measured by ELISA or the like.

In cases of P-selectin, osteoprotegerin, cystatin C, GDF-15, ET-1, IL-6, CCL2 (MCP-1), TNFRI, TNFRII, SP-D, S100A9, adiponectin, MMP-2, MMP-3, or TIMP-1, the expression is preferably protein expression, more preferably protein expression in blood.

In cases of IL-6 or CCL2 (MCP-1), the expression may be mRNA expression, more preferably mRNA expression in a tissue.

In cases of collagen or α-SMA, the expression is preferably protein expression, more preferably protein expression in a skin tissue. The collagen is preferably Collagen 1A1 (COL1A1).

Dosage Form

Compound A, or a pharmaceutically acceptable salt or co-crystal thereof may be administered as it is to a patient. However, preferably, Compound A, or a pharmaceutically acceptable salt or co-crystal thereof may be mixed with a medicinally and pharmaceutically acceptable additive(s) to provide a preparation in a form. Examples of the medicinally and pharmaceutically acceptable additive(s) include appropriate excipients, disintegrants, binders, lubricants, coating agents, colorants, diluents, bases, isotonic agents, and the like used in the production of medicaments.

Compound A, or a pharmaceutically acceptable salt or co-crystal thereof, together with the above-described additive(s), may be prepared into an appropriate dosage form (such as a powder, an injection solution, a tablet, a capsule, or a topical preparation), and may then be administered to a patient (human or mammal) using an appropriate administration method in accordance with the dosage form (such as intravenous administration, oral administration, percutaneous administration, or topical administration). Among these, oral administration is preferred.

A dose of a medicament including Compound A, or a pharmaceutically acceptable salt or co-crystal thereof is a dose at which the medicament can be safely used with low toxicity, and which allows production of a therapeutic effect or prophylactic effect on interstitial lung disease, or on the disease or symptom accompanied by scleroderma. The dose may be appropriately determined in accordance with the type, the severity, and the symptoms of the disease in the subject to whom the medicament is administered; and the age, the sex, the body weight, the administration route, and the like. For example, the medicament is parenterally administered at about 0.0001 to 1000 mg/patient/day, preferably about 0.001 to 1000 mg/patient/day, especially preferably 0.01 to 500 mg/patient/day, or orally administered at about 0.0001 to 1000 mg/patient/day, preferably 0.01 to 500 mg/patient/day, in terms of the amount of Compound A, or a pharmaceutically acceptable salt or co-crystal thereof. The medicament is administered especially preferably at 100 to 300 mg/patient/day, and specific examples include at 100 mg/patient/day, at 200 mg/patient/day, and at 300 mg/patient/day.

Medicament Including MC1R Agonist as Effective Ingredient

A medicament according to another aspect of the present invention includes an MC1R agonist as an effective ingredient and relates to a medicament for treatment or prevention of a disease or symptom selected from Raynaud phenomenon, digital ulcers, pulmonary hypertension, renal crisis, interstitial lung disease, skin fibrosis, flexion contracture, gastroesophageal reflux disease, and dysphagia in a subject.

More specifically, it is found that an MC1R agonist is therapeutically and/or prophylactically effective on Raynaud phenomenon, digital ulcers, pulmonary hypertension, renal crisis, interstitial lung disease, skin fibrosis, flexion contracture, gastroesophageal reflux disease, and dysphagia, and hence a novel pharmaceutical use of an MC1R agonist for these diseases is provided.

Examples of the interstitial lung disease herein include idiopathic interstitial pneumonia, and connective tissue disease-associated interstitial lung disease. Examples of the idiopathic interstitial pneumonia include idiopathic pulmonary fibrosis. Examples of the connective tissue disease-associated interstitial lung disease include systemic sclerosis-associated interstitial lung disease. Examples of the pulmonary hypertension include pulmonary arterial hypertension.

The MC1R agonist that may be used is not limited to Compound A, or a pharmaceutically acceptable salt or co-crystal thereof as long as it is a compound that has an agonistic activity on MC1R. The MC1R agonist is not limited to low molecular weight compounds. The MC1R agonist may be identified or acquired by screening using as indices binding to MC1R and an increase in the cAMP level in MC1R-expressing cells.

More specifically, the MC1R agonists other than Compound A are not limited as long as they are compounds having an agonistic effect on MC1R, and their examples include α-MSH (α-melanocyte stimulation hormone), which is an endogenous ligand of MC1R, and analogs thereof (such as afamelanotide).

A dosage form, a dose, and the like of a medicament including the MC1R agonist may be appropriately determined in accordance with the type of the compound; the type, the severity, and the symptoms of the disease; and the age, the sex, the body weight, the administration route, and the like.

Method of Determining Therapeutic Effect

A method of determining a therapeutic effect of an MC1R agonist on a patient with systemic sclerosis according to another aspect of the present invention includes measuring the expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA in a sample from the patient with systemic sclerosis.

Compound A, or a pharmaceutically acceptable salt or co-crystal thereof that is an MC1R agonist decreases the expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA, to produce a therapeutic or prophylactic effect on systemic sclerosis, and on diseases and symptoms accompanied by systemic sclerosis, such as Raynaud phenomenon, digital ulcers, pulmonary hypertension, renal crisis, interstitial lung disease, skin fibrosis, flexion contracture, gastroesophageal reflux disease, and dysphagia.

Thus, in cases where the expression level of at least one of these markers decreases after a certain period of time (for example, about 2 weeks to 52 weeks, preferably 12 weeks to 52 weeks) after administration of an MC1R agonist to a patient with systemic sclerosis, the MC1R agonist can be determined to be effective for treatment of systemic sclerosis.

The measurement of an expression amount of each marker can be carried out using a biological sample such as a skin tissue or blood isolated from the patient.

The extent of the decrease may be a significant decrease relative to the expression level before the administration. For example, the decrease preferably occurs to an extent at which the difference between the expression level after the administration and the normal value is not more than 50% that of the difference between the expression level before the administration and the normal value.

Another method of determining that MC1R agonist is effective for treatment of systemic sclerosis includes ACR-CRISS as complex evaluation item and more specific examples include indices for determining skin hardening such as MRSS, indices for determining lung function such as FVC, and symptom improvement-related indices for subjective evaluation by patients themselves or healthcare professionals such as Patient Global Assessment, Physician Global Assessment or HAQ-DI. When these indices collectively show a significant trend toward improvement compared to the pre-treatment or placebo group, it can be determined that the MC1R agonist is effective for the treatment of systemic sclerosis.

In cases where the MC1R agonist is determined to have a therapeutic effect, the treatment with the MC1R agonist may be continued, and the MC1R agonist may be administered again. On the other hand, in cases where the level of the marker does not decrease, the therapeutic effect of the MC1R agonist may be determined to be insufficient, so that the treatment with the MC1R agonist may be stopped to choose another therapeutic method. Alternatively, the dose may be increased or decreased in order to exert a therapeutic effect.

Method of Determining Whether or not MC1R Agonist can be Administered

A method of determining whether or not an MC1R agonist can be administered to a patient with systemic sclerosis according to another aspect of the present invention includes measuring the level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA in a sample from the patient with systemic sclerosis.

In a patient with systemic sclerosis showing a significant increase in the expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA relative to the expression level in a healthy individual, an MC1R agonist such as Compound A decreases the expression level of the marker, to produce a therapeutic or prophylactic effect on systemic sclerosis, and on diseases and symptoms accompanied by systemic sclerosis, such as Raynaud phenomenon, digital ulcers, pulmonary hypertension, renal crisis, interstitial lung disease, skin fibrosis, flexion contracture, gastroesophageal reflux disease, and dysphagia.

Thus, in cases where a measured expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA in a biological sample such as blood or a skin tissue isolated from a patient with systemic sclerosis is increased relative to the expression level in a healthy individual, it can be determined that an MC1R agonist can be administered. For several of these markers, examples of the expression levels (blood protein levels) assumed to be increased relative to those in healthy individuals are shown below.

P-selectin: about 100 ng/mL
OPG: about 110 pg/ml
GDF-15: 1000 pg/mL
ET-1: 3 pg/mL
S100A9: 100 ng/mL
SP-D: cutoff value, 110 ng/mL or higher
IL-6: about 15 pg/mL
P-selectin: about 100 ng/mL The extent of the increase may be a significant increase relative to the expression level in a healthy individual. The extent of the increase is, for example, a 2-fold or more increase relative to the expression level in a healthy individual.

EXAMPLES

Hereinafter, the present invention is explained by referring to working examples, but the present invention is not limited to the embodiments below.

Materials and Methods
Test Substances

Compound A (synthesized according to WO 2015/182723) were dissolved in dimethylsulfoxide (DMSO) for in vitro assays or suspended in 0.5% methylcellulose solution for in vivo experiments. In these examples, a co-crystal of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, and phosphoric acid was used.

BLM-Induced SSc Murine Model—Prophylactic Evaluation

Ten-week-old female C3H/HeNCrlCrlj mice (Charles River Laboratories Japan, Inc.) were used, and all animal experiments were conducted in accordance with the Guidelines for Animal Experimentation of Mitsubishi Tanabe Pharma Corporation.

The back of mice was shaved, and the middle of the back was marked with oil-based red ink. Phosphate-buffered saline (PBS) or BLM (Nippon Kayaku) (0.15 mg/0.1 mL per animal) was subcutaneously injected at the marked site once daily from day 0 to day 25. Compound A solutions at 0.1 mL/10 g of body weight were orally administered once daily (approximately 2 hours before the BLM injection) for 29 consecutive days from day 0 until the day before the end of evaluation (day 28).

On day 29, mice were euthanized by inhalation anesthesia with isoflurane, and whole blood and back skin samples were collected. The left lung was dissected, weighed, and immersed in RNAlater solution (Qiagen). The collected blood was separated into serum. The injection site of skin was excised, weighed (wet weight) and immersed in 0.5 mol/L acetic acid solution containing 0.3 mg/mL pepsin to solubilize collagen. The collagen content of the solubilized sample was explored using the QuickZyme Soluble Collagen Assay kit (QuickZyme Biosciences), and absorbance was determined by a microplate reader (VERSAmax, Molecular Devices, LLC). Serum levels of surfactant protein D (SP-D) were assayed using the Rat/Mouse SP-D kit YAMASA EIA (Yamasa Corporation), and absorbance was determined by a microplate reader (VERSAmax, Molecular Devices, LLC). Total RNA of lungs was isolated using RNeasy 96 Universal Tissue Kit (Qiagen) according to the manufacturer's instructions. Real-time PCR was performed using the One Step SYBR PrimeScript PLUS RT-PCR Kit (Takara Bio Inc.) and ABI PRISM 7900HT Real Time PCR System (Applied Biosystems). Takara perfect real time primer pairs (Takara Bio Inc.) were used to analyze the gene expression of chemokine Ccl2 (also named as monocyte chemotactic protein-1 (Mcp-1, MA066003)), interleukin-6 (IL-6, MA039013), and hypoxanthine phosphoribosyltransferase (Hprt, MA031262). Quantification was performed using the comparative CT (cycle threshold) method employing Hprt as the housekeeping gene. A serum concentration of endothelin 1 (ET-1) was assayed using Quantikine Endothelin-1 (R & D systems) and the absorbance was measured by the microplate reader (VERSAmax, Molecular Devices, LLC).

BLM-Induced SSc Murine Model—Therapeutic Evaluation

Six to seven-week-old female C57BL/6 mice (Laboratory Animal Service Center, University of Zurich) were used, and all animal experiments were conducted in accordance with the European Community Council Directive for Care and Use of Laboratory Animals and the Swiss law. BLM (Baxter AG) was dissolved in saline and subcutaneously administered every other day (0.1 mg/0.1 mL per animal) in defined areas of the upper back for 6 weeks (day 1 to 42). During the last 3 weeks of the experimental period (day 22 to 42), the mice were orally administered Compound A, imatinib (Selleckchem), or vehicle once daily. On day 43, the mice were euthanized by $CO_2$ inhalation, and back skin and serum samples were collected. Mouse skin samples were fixed in 4% formalin and embedded in paraffin. For hematoxylin and eosin (HE) staining, sections of the mouse skin were used. After deparaffinization, Mayer's hematoxylin solution (J. T. Baker/Stehelin) was applied for 10 min. Eosin (Chroma/Reactolab) staining was performed for 1 min. For permanent mounting, the sections were dehydrated and dried, followed by mounting using Pertex (Histolab). Skin thickness was determined by measuring the thickness of HE-stained skin samples using a microscope with an image analysis program (Zeiss Imager Z1, Carl Zeiss AG). Skin thickness was measured by randomly selecting 3 records of non-overlapping pictures taken at 100× magnification of each piece of HE-stained mouse skin sample (in total, 6 pictures and 18 measurements per sample). Analyses were performed by two independent examiners in a blinded manner. Each value of skin thickness was calculated as an average of 36 measurements.

Alpha smooth muscle actin (αSMA) staining was performed for skin sections. After deparaffinization and rehydration, 10% goat serum (Vector Laboratories) was used to prevent unspecific antibody binding. The samples were incubated with primary antibody (1:750, monoclonal mouse anti-αSMA, clone 1A4, Sigma-Aldrich) for 1 hour at room temperature, followed by incubation with alkaline phosphatase-labeled goat anti-mouse secondary antibody (Dako) for 30 min at room temperature. Staining was accomplished using Vector Red (Vector Laboratories). A nuclear counterstain was performed using Meyer's hematoxylin (J.T. Baker). For permanent mounting, the sections were dehydrated and dried followed by mounting using Pertex (Histolab). The numbers of αSMA-positive myofibroblasts in the skin were determined manually using a microscope with an image analysis program (Zeiss Imager Z1). Quantification of αSMA-positive myofibroblasts in mouse skin was performed for 6 slides by recording 6 randomly selected, non-overlapping areas (172.5×218 µm, 37605 µm$^2$) per slide of mouse skin at 400× magnification. Two independent examiners performed the analyses in a blinded manner. The number of αSMA-positive myofibroblasts in an area of 37605 µm$^2$ was calculated as an average of 12 values.

Masson's trichrome staining of skin sections was performed. After deparaffinization, sections were exposed to Weigert's iron hematoxylin solution for 3 min, Ponceau-fuchsin-azophloxin mixture for 6 min, and 3% phosphomolybdic acid in 2% Orange G for 3 min or until collagen was discolored. For permanent mounting, the sections were dehydrated and dried, followed by mounting using Pertex (Histolab). Masson's trichrome-stained sections were observed using a microscope with an image analysis program (Zeiss Imager Z1) at 100× magnification.

Microarray-Based Gene Expression Analysis

Gene Expression Profiling with Agilent Expression Array

Total RNA of mouse lung tissue samples of PBSY_vehicle (control group without disease), BLM_vehicle (control group with disease), and BLM_Compound A (0.3 mg/kg) obtained from the BLM-induced SSc model (prophylactic evaluation) was used for analysis. The purity, concentration, and quality of the RNA samples were confirmed with NanoDrop 2000 (Thermo Fisher Scientific) and Agilent 2100 bioanalyser (Agilent Technologies). The RNA was then Cy3-labeled using a Low Input Quick Amp Labeling Kit, one-color (Agilent Technologies). Labeled cRNA samples were fragmented, and then hybridized with the Agilent SurePrint G3 Mouse GE v2 8×60 K Microarray (Agilent Technologies) using a Gene Expression Hybridization Kit (Agilent Technologies). After hybridization, the microarray was washed with the Gene Expression Wash Buffers Pack (Agilent Technologies) and imaged with a scanner to detect the signals. Signal intensities were evaluated with Agilent Feature Extraction software 12.0.

Bioinformatics Analysis

Bioinformatics analysis in this study was performed with software, including GeneSpring GX 14.9.1, IPA 2019 autumn, and Microsoft Excel 2010. Genes that fluctuated ≥2 fold in BLM_vehicle group in comparison with those of the PBS_vehicle group and that satisfied a p-value <0.05 of the moderated t-test were defined as "differentially expressed genes (DEGs) in the disease model". Among DEGs, the genes in the Compound A treatment group that fluctuated ≥1.5 fold in the opposite direction and met a p-value <0.05 of the moderated t-test in comparison with those of the BLM_vehicle group were defined as "DEGs by Compound A treatment". DEGs were inputted into IPA and two types of calculations were performed: "Canonical pathways" and "Diseases or functions". Here, "Canonical pathways" is described as "pathways" and "Diseases or functions" is described as "category". The former contains a list for a series of gene interactions and the latter is a list related to diseases and biological functions. These datasets are registered in the IPA software. Initially, the Fisher's exact test was used to calculate the probability of overlap between two sets of genes. Thereafter, downstream effect analysis (DSEA) was used to calculate the activation z-score. DSEA is a technique for predicting the direction of change in expression patterns (either activation or inhibition) based on the expected causal effects between genes and functions. Based on the results of the DSEA analysis, information about the cell type (macrophages, neutrophils, mononuclear leukocytes, T-lymphocytes, B-lymphocytes, smooth muscle cells, endothelial cells, epithelial cells, and fibroblasts) that may be involved in the pathogenesis of SSc was extracted. Subsequently, information regarding biological functions and molecular signaling pathways, such as inflammation/immune abnormality, vascular dysfunction, and fibrosis, involved in the pathogenesis of SSc are extracted.

Serum Protein Profiling

Serum samples were obtained from mice of the BLM-induced SSc model (therapeutic evaluation). Samples from the saline_vehicle (control group without disease), BLM_vehicle (control group with disease), BLM_Compound A (10 mg/kg), and BLM_imatinib (150 mg/kg) groups were used for analysis. Using a Luminex assay (R&D systems), 110 proteins were investigated (supplemental Table s1). Proteins satisfying any of the following criteria were analyzed: i) all samples were adequately measured within the quantitative range; ii) more than half of the samples in one or more groups were quantified, although some samples were out of the quantitative range.

Skin Biopsy Samples and Fibroblast Isolation (Fibroblast Assay)

Full-thickness skin biopsies were obtained from clinically involved skin of patients affected by dcSSc, who were recruited from the Systemic sclerosis clinic within the Leeds Institute of Rheumatic and Musculoskeletal Medicine (UK). Control skin samples were from healthy donors. All patients with dcSSc and healthy donors provided written informed consent through the stratification for risk of progression in systemic sclerosis (STRIKE SSC), which had been approved by the North-East Research Ethic committee. Patients with SSc fulfilled the 2013 ACR/EULAR classification criteria for SSc and were classified as having dcSSc according to the LeRoy and Medsger criteria.

Dermal fibroblasts were isolated from the skin biopsy samples of healthy donors and SSc patients. The skin biopsy samples were minced with a scalpel, placed in plastic culture dishes and covered with Dulbecco's Modified Eagle Medium (DMEM) with 4.5 g/L glucose (Thermo Fisher Scientific) supplemented with 20% fetal calf serum (FCS, Thermo Fisher Scientific), 1% penicillin and streptomycin (Merck), and 1 µg/ml of amphotericin (Thermo Fisher Scientific) and cultured at 37° C. in a humidified atmosphere of 5% $CO_2$. Additional growth medium was added after 3 days with no amphotericin. After 7 days, culture medium was replaced with medium containing 10% FCS and subsequently replenished every 2 to 3 days. When a visible outgrowth of cells was obtained, the fibroblasts were passaged. Briefly, cells were incubated with PBS containing 0.1% EDTA for 5 min, and then detached with trypsin-EDTA solution (Merck), and cultured until 70-80% confluent in DMEM (1 g/L glucose) supplemented with 10% FCS and 1% penicillin and streptomycin. After a subsequent passage, primary cells were retrovirally immortalized using human telomerase reverse transcriptase.

Treatment of Fibroblast

Cells were grown to confluence in six-well culture plates in DMEM with 10% FCS, serum starved in DMEM 1% FCS for 24 hours, followed by a 24-hour incubation in the presence or absence of transforming growth factor-β1 (TGF-β1, 10 ng/mL) (Sigma-Aldrich). Compound A or α-MSH was added to the culture medium during TGF-β1 stimulation. DMSO (0.1%) was added to all non-Compound A-containing wells to normalize for the DMSO-induced effects on cells.

RNA Isolation and Real-Time PCR Analysis (Fibroblast Assay)

Total RNA was extracted using the Zymo quick RNA mini prep kit according to manufacturer's instructions (Zymo Research Corporation). First-strand cDNA was synthesized using the High-Capacity cDNA Reverse Transcription kit (Thermo Fisher Scientific). Quantitative RT-PCR was performed in triplicates using SYBR Green RT-PCR Mastermix Kit (Thermo Fisher Scientific) and the ABI PRISM 7500 Fast Real Time PCR System (Applied Biosystems). Quantification was performed using the comparative CT (cycle threshold) method employing GAPDH as the housekeeping gene. Primer sequences used in qPCR analyses were as follows:

```
GAPDH
forward
                                    (SEQ ID NO: 1)
5'-ACC CAC TCC TCC ACC ACC TTT GA-3', reverse
                                    (SEQ ID NO: 2)
5'-CTG TTG CTG TAG CCA AAT TCG T-3';

αSMA
forward
                                    (SEQ ID NO: 3)
5'-TGT ATG TGG CTA TCC AGG CG-3', reverse
                                    (SEQ ID NO: 4)
5'-AGA GTC CAG CAC GAT GCC AG-3';
and COL1A1
forward
                                    (SEQ ID NO: 5)
5'-GCT CCG ACC CTG CCG ATG TG-3', reverse
                                    (SEQ ID NO: 6)
5'-CAT CAG GCG CAG GAA GGT CAG C-3'.
```

Skin Biopsy Samples (Immunohistochemical Analysis of MC1R)

Full-thickness skin biopsies were obtained from the clinically involved skin of patients affected by dcSSc (n=50) or limited cutaneous SSc (lcSSc, n=10) who were recruited from the University of Erlangen-Nuremberg (Germany). Control skin samples (n=30) were from healthy donors. All patients with dcSSc and healthy donors provided written informed consent as approved by the institutional ethics committee. Patients with SSc fulfilled the 2013 ACR/EULAR classification criteria for SSc and were classified as having dcSSc according to the LeRoy and Medsger criteria.

Immunohistochemical Analyses of MC1R

Immunohistochemical analysis of paraffin-embedded sections was performed as previously described.

Single Staining

Protein expression of MC1R in skin biopsy samples was detected by incubation with an anti-MC1R monoclonal antibody (1:50, clone EPR6530; Abeam). Peroxidase-labeled goat anti-rabbit secondary antibody (Dako) was used as the secondary antibody. Isotype-matched antibodies were used as controls. Staining was visualized with 3,3'-diaminodbenzidine (Sigma-Aldrich) and peroxidase substrate solution (Sigma-Aldrich). A nuclear counterstain was performed using Meyer's hematoxylin (J.T. Baker). For permanent mounting, the sections were dehydrated and dried, followed by mounting using Pertex (Histolab). Qualitative assessment was performed by assigning a score based on staining intensity after identifying each stained cell type and tissue element (the number of positive cells was not taken into account for the scoring). The staining intensity scale used for the evaluation is as follows: no staining was scored as 0, faint staining was scored 0.5, light staining was scored as 1, moderate staining was scored as 2, and dark staining was scored as 3.

Double Staining

To identify the cell types in the skin that were positive for MC1R, double staining for cell types of interest was performed. The anti-MC1R monoclonal antibody was reacted in the same manner as described above. Alexa Fluor 488-labeled donkey anti-rabbit secondary antibody (Life Technologies) was used as the secondary antibody. Subsequently, double staining was performed using the following antibodies against cell-specific markers: anti-prolyl-4-hydroxylase p antibodies (1:50, Acris Antibodies) for fibroblasts, anti-CD68 antibodies (1:200, Biolegend) for monocytes/macrophages, anti-CD66b antibodies (1:250, Biolegend) for neutrophils, and anti-CD31 antibodies (1:50, R&D Systems) for endothelial cells. Antibodies labeled with Alexa Fluor 594 (Invitrogen) were used as secondary antibodies. For nuclear counterstaining, 4',6'-diamino-2-phenylindole (Sigma-Aldrich) was used. Immunofluorescence stained tissue sections were analyzed using a Nikon Eclipse 80i microscope (Nikon).

Statistical Analysis

All quantitative pharmacological data were expressed as mean±standard error of the mean (SEM). Statistical differences between groups in each study were assessed as described below. All analyses were performed using the SAS system, and tests were two-tailed with a significance level of <0.05 or one-tailed with a significance level of <0.025.

BLM-Induced SSc Murine Model—Prophylactic Evaluation

Differences between PBS_vehicle (control group without disease) and BLM_vehicle (control group with disease) groups were analyzed using Student's t-test. Differences between the BLM_vehicle and Compound A-treated groups were analyzed using Williams' test. According to repeated measures analysis of variance (group effect and interaction effect; group×time point), body weights were significantly different ($P<0.01$) in the groups mentioned above during the 29-day course of the experiment. Therefore, differences in body weight at each time point were analyzed between the PBS_vehicle and BLM_vehicle groups using Student's t test. Differences between the BLM_vehicle and Compound A-treated groups were analyzed using Williams' test.

BLM-Induced SSc Murine Model—Therapeutic Evaluation

Differences between the saline_vehicle (control group without disease) and BLM_vehicle (control group with disease) groups, and between the BLM_vehicle and imatinib-treated groups were analyzed using Wilcoxon test (two-sided). Differences between the BLM_vehicle and Compound A-treated groups were analyzed using Shirley-Williams' multiple comparison test (one-sided).

Analysis of Serum Protein Profiling

Differences between the saline_vehicle and BLM_vehicle groups, between the BLM_vehicle and Compound A-treated groups, and between the BLM_vehicle and imatinib-treated groups were analyzed using Student's t-test.

Results

Effects of Compound a on BLM-Induced Skin Fibrosis and Lung Inflammation—Prophylactic Evaluation FIGS. 1(A)-1(H) show the effect of Compound A on skin fibrosis and lung inflammation in a bleomycin (BLM)-induced systemic sclerosis (SSc) model: prevention evaluation (A: Experimental schedule. B: Changes in the body weight of the mice during the experimental period. C: Collagen content in the skin. D: Wet weight of the left lung. E: Serum level of surfactant protein-D (SP-D). F and G: Expression of chemokine Ccl2 (another name, Mcp-1) and interleukin-6 (Il-6) mRNAs (calculated as relative values to hypoxanthine phosphoribosyltransferase 1 (Hprt)) in lung. H: Serum concentration of endothelin-1 (ET-1). B to H: Each bar represents the mean±SEM (n=10 in all groups except 0.03 mg/kg Compound A treatment group (n=9)). ##p<0.01, BLM vs. PBS (according to Student's t-test); ** p<0.005, BLM vs. Compound A (according to Williams' test)). On day 0 to day 25, BLM was administered daily to the same area of the back skin of mice. For 29 days (day 0 to day 28), Compound A or a vehicle was orally administered to the mice once daily. Each sample was collected on day 29.

The effects of Compound A on skin fibrosis and lung inflammation were evaluated using the BLM-induced SSc model (prophylactic evaluation). It was found that daily subcutaneous injection of high dose BLM induced not only skin fibrosis but also lung inflammation, and optimized the experimental conditions for simultaneous evaluation of both endpoints as follows: BLM (0.15 mg/animal) was subcutaneously injected once daily from day 0 to day 25, Compound A was orally administered once daily from day 0 to day 28, and subsequently, the endpoints were measured on day 29 (FIG. 1A). Subcutaneous injection of BLM decreased the body weights of the mice from day 0 to day 29, which was significantly improved by Compound A at ≥0.3 mg/kg (FIG. 1B). Subcutaneous injection of BLM significantly increased the collagen content of the skin, indicating the progression of skin fibrosis (FIG. 1C). Similarly, BLM injection significantly increased serum level of SP-D (lung injury marker secreted by alveolar epithelial type II cells) and the wet weight of the left lung and Mcp-1 and IL-6 mRNA expression in the lung and serum concentration of ET-1 indicating the progression of lung inflammation (FIG. 1D to H). These increases were inhibited significantly by Compound A at ≥0.3 mg/kg (FIG. 1C to H). These results showed that prophylactic treatment of Compound A inhibited both the progression of skin fibrosis and lung inflammation in a dose-dependent manner at the same dose range.

Effects of Compound A on Pre-Established BLM-Induced Skin Fibrosis—Therapeutic Evaluation FIGS. 2(A)-2(D) show the effect of Compound A on skin fibrosis in a BLM-induced SSc model: treatment evaluation (A: Experimental schedule. B: Thickness of HE-stained skin samples measured under the microscope. C: Number of αSMA-positive myofibroblasts in a specific area of the skin as calculated by microscopy of a skin sample subjected to staining of α-smooth muscle actin (αSMA, encoded by the Acta2 gene). D: Representative images (photographs) obtained by Masson's trichrome staining of the back skin in each group. B and C: Each bar represents the mean±SEM (n=8). #$p<0.05$, ##$p<0.01$, group 3 vs. group 1, and group 3 vs. group 6 (according to Wilcoxon test (two-sided)). * $p<0.025$, ** $p<0.005$, group 3 vs. group 4 and group 5 (according to Shirley-Williams test (one-sided)). BLM was injected to the same area of the back skin of mice every other day for 6 weeks. During the last 3 weeks of the experimental period, Compound A, imatinib, or a vehicle was orally administered to the mice once daily. Mouse skin samples were collected on day 43, and embedded in paraffin.

This study aimed to evaluate the therapeutic effect of Compound A using a pre-established BLM-induced SSc model (therapeutic evaluation), which was optimized for the therapeutic evaluation of skin fibrosis. Skin fibrosis is gradually induced over 6 weeks under mild conditions by injecting a lower dose of BLM every other day compared with the above-mentioned BLM model for prophylactic evaluation. BLM (0.1 mg/animal) was subcutaneously injected every other day for 6 weeks, and during the last 3 weeks of the experimental period, the mice were orally administered Compound A, imatinib, or vehicle once daily. Group 2, in which BLM was injected for 3 weeks followed by saline injection for 3 weeks, was set as the group reflecting the fibrosis state at the start of drug administration (FIG. 2A). Subcutaneous injections of BLM for 6 weeks significantly increased skin thickness (FIG. 2B) and number of αSMA-positive myofibroblasts in the dermis (FIG. 2C). Using Masson's trichrome staining, accumulation of dense collagen fibers in the dermis and loss of dermal white adipose tissue after BLM injection were observed (FIG. 2D). Prolonged injection of BLM for 6 weeks tended to increase the severity of skin fibrosis compared with injections for 3 weeks followed by injections of saline for an additional 3 weeks. The BLM-induced increase of skin thickness and αSMA-positive myofibroblasts was significantly inhibited by Compound A at 3 and 10 mg/kg (FIGS. 2B and C). Compound A inhibited BLM-induced loss of dermal white adipose tissue (FIG. 2D). Similarly, imatinib, a tyrosine kinase inhibitor used as a positive control, at 150 mg/kg also improved these parameters. The results of these parameters in the Compound A-treated group were almost the same as those in group 2 that were treated with BLM for 3 weeks and saline for 3 weeks, indicating that Compound A almost completely inhibited the progression of fibrosis after 3 weeks (FIG. 2B to D). These results demonstrated that Compound A suppresses the development of skin fibrosis even if drug intervention is performed after the fibrosis has already been partially induced.

Analysis of Mechanism of Action of Compound a by Microarray-Based Gene Expression Analysis FIG. 3A shows gene expression profiling of lung tissues of BLM-induced SSc model animals to which "Compound A or the like" was administered, which profiling was carried out using a microarray. DNA microarray analysis was carried out using lung samples from a BLM-induced SSc model (prevention model) to which 0.3 mg/kg of Compound A was administered. Bioinformatics analysis was carried out using IPA software, and two datasets were used to perform two types of calculations ("Canonical pathways" and "Diseases or functions"). Downstream effect analysis was used to calculate the activation z-score. This diagram shows principal component analysis of a gene expression profile in PBS_vehicle vs. BLM_vehicle vs. BLM_Compound A group.

To explore the mechanism of action of Compound A, microarray-based gene expression analysis was performed. Data for DNA microarray analyses of mouse lung tissue samples were obtained from the BLM-induced SSc model (prophylactic evaluation). The number of DEGs in the disease model was 3337, and the number of DEGs by Compound A treatment was 1477. The principal components plot showed that PBS_vehicle, BLM_vehicle, and Compound A-treated groups were clearly separated into different clusters (FIG. 3A).

Figure 3B:
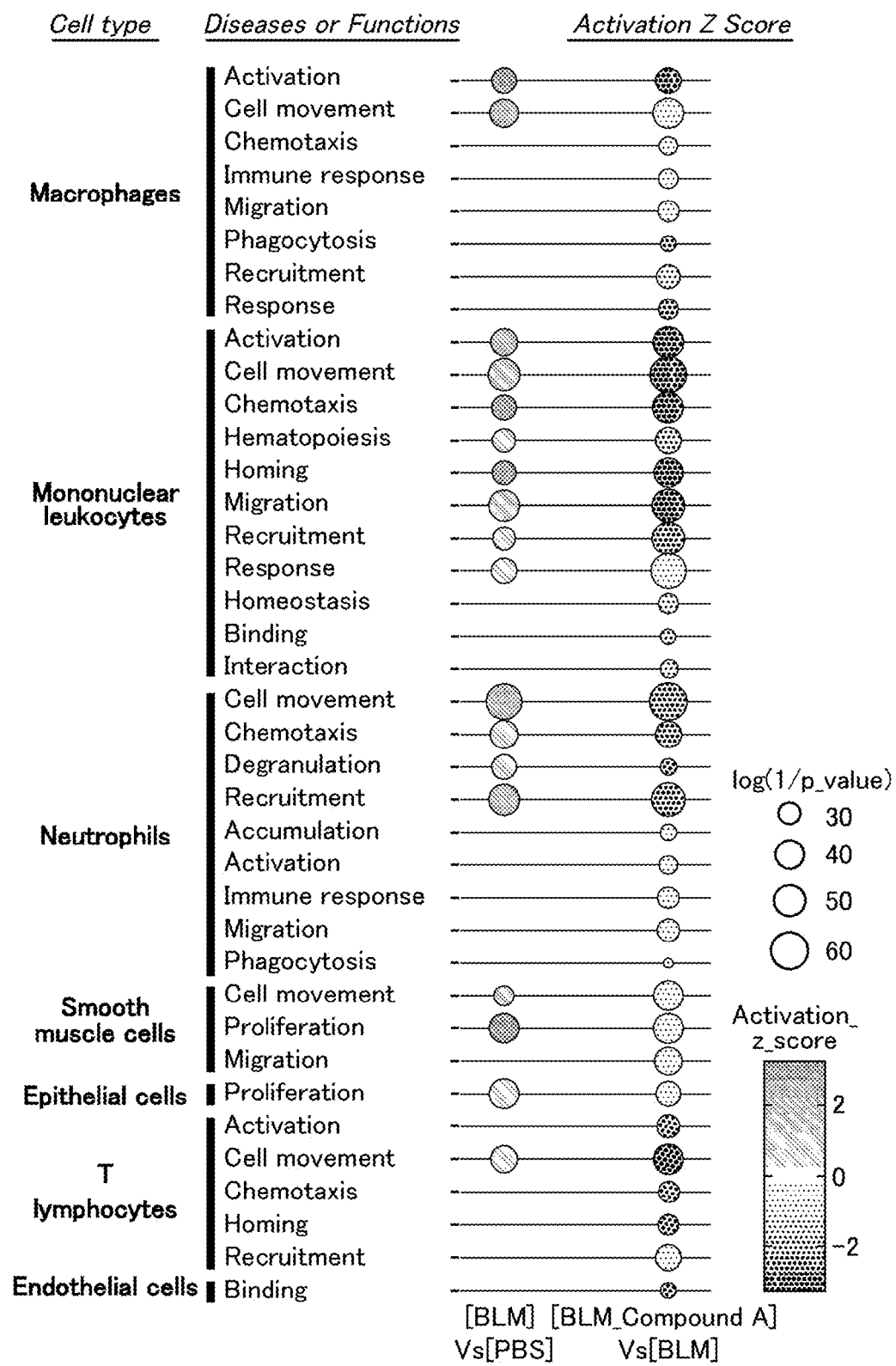
FIG. 3B shows gene expression profiling of lung tissues of BLM-induced SSc model animals to which Compound A or a pharmaceutically acceptable salt or co-crystal thereof was administered, which profiling was carried out using a microarray.

FIG. 3B shows gene expression profiling of lung tissues of BLM-induced SSc model animals to which "Compound A or the like" was administered, which profiling was carried out using a microarray. This diagram shows the categories of the cell types that showed changes due to the BLM injection and the Compound A administration.

The results of analysis using IPA software are described below (the raw data used to prepare FIG. 3 are listed in supplemental Table s2). In the analysis that focused on the cell types related to SSc pathology, the categories that changed in the BLM_vehicle or Compound A-treated groups where the absolute value of the z-score was ≥2 are listed in FIG. 3B.

Figure 3C:
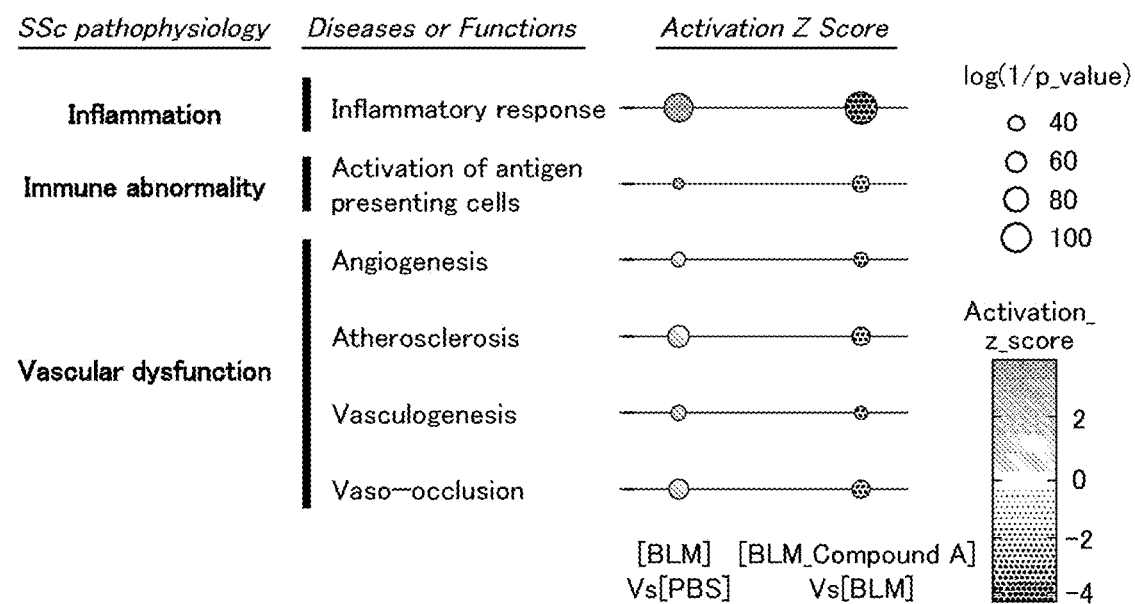
FIG. 3C shows gene expression profiling of lung tissues of BLM-induced SSc model animals to which Compound A or a pharmaceutically acceptable salt or co-crystal thereof was administered, which profiling was carried out using a microarray.

FIG. 3C shows gene expression profiling of lung tissues of BLM-induced SSc model animals to which "Compound A or the like" was administered, which profiling was carried out using a microarray. This diagram shows categories in relation to pathological conditions of SSc, which categories showed changes due to administration of BLM and Compound A.

Numerous categories related to macrophages, mononuclear leukocytes (monocytes) and neutrophils were extracted, followed by endothelial cell-related categories, suggesting that these cells are main target cells of Compound A in the BLM-induced SSc model. T-lymphocyte- and endothelial cell-related categories were not changed by BLM but were suppressed by Compound A, and none of B-lymphocyte- and fibroblast-related categories met the extraction criteria. In the analysis that focused on biological functions, categories of inflammatory response (related to inflammation), activation of antigen-presenting cells (related to immune abnormality), angiogenesis, atherosclerosis, vasculogenesis, and vaso-occlusion (related to vascular dysfunction) were activated by BLM and were suppressed by Compound A (FIG. 3C).

Figure 3D:
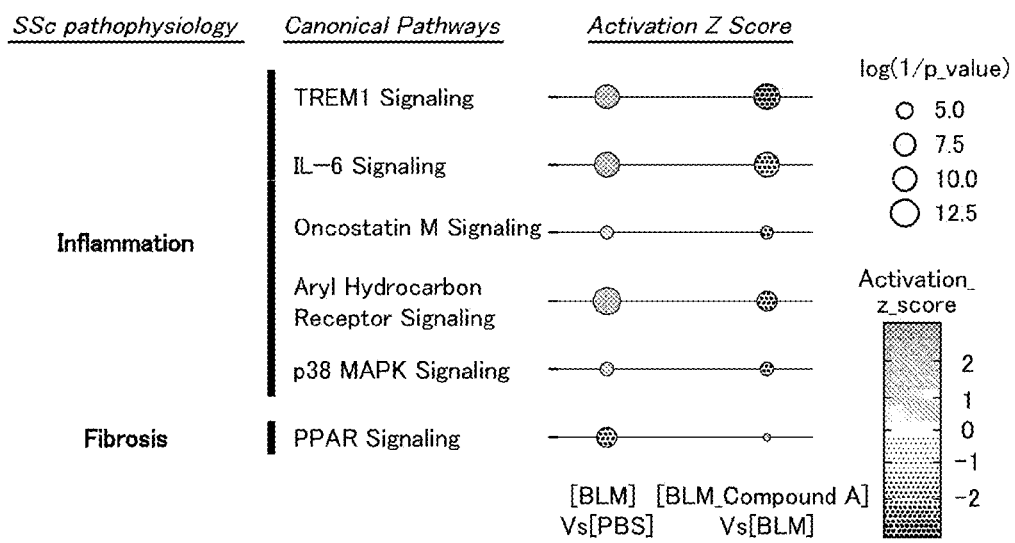
FIG. 3D shows gene expression profiling of lung tissues of BLM-induced SSc model animals to which Compound A or a pharmaceutically acceptable salt or co-crystal thereof was administered, which profiling was carried out using a microarray.

FIG. 3D shows gene expression profiling of lung tissues of BLM-induced SSc model animals to which "Compound A or the like" was administered, which profiling was carried out using a microarray. This diagram shows signaling pathways in relation to pathological conditions of SSc, which signaling pathways showed changes due to administration of BLM and Compound A. This diagram shows genes involved in IL-6 signaling, which genes showed changes.

Figure 3E:
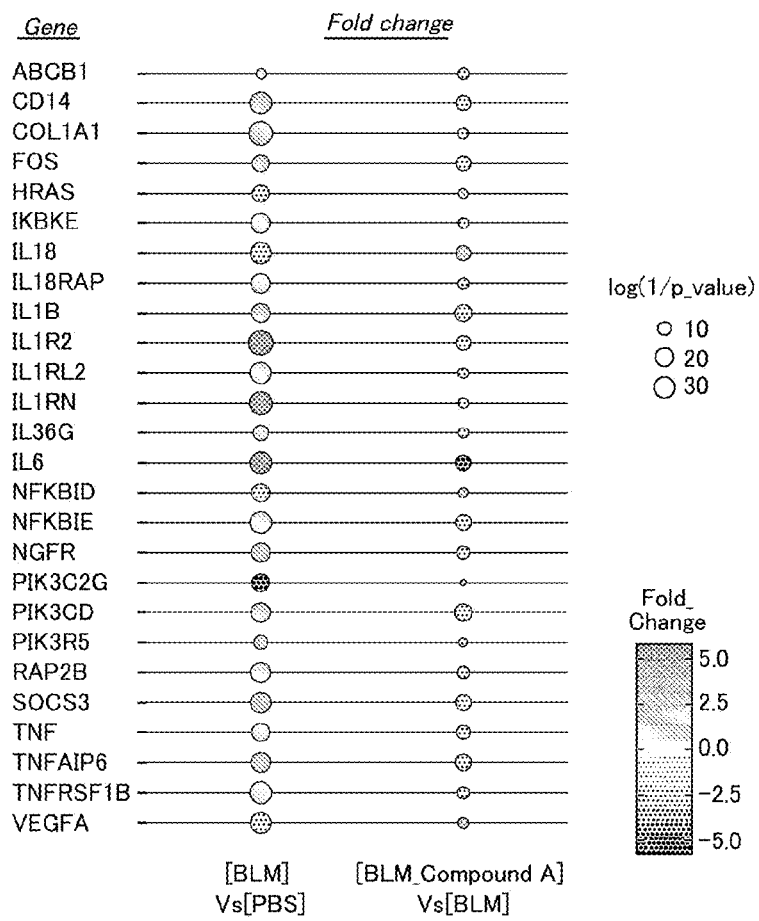
FIG. 3E shows gene expression profiling of lung tissues of BLM-induced SSc model animals to which Compound A or a pharmaceutically acceptable salt or co-crystal thereof was administered, which profiling was carried out using a microarray.

In the analysis that focused on molecular signaling pathways, the pathways for triggering receptor expressed on myeloid cells-1 (TREM1), IL-6, oncostatin M (related to inflammation), and peroxisome proliferator-activated receptor (PPAR) (related to fibrosis) were all affected by Compound A (FIG. 3D). FIG. 3E shows gene expression profiling of lung tissues of BLM-induced SSc model animals to which "Compound A or the like" was administered, which profiling was carried out using a microarray. FIG. 3F shows gene expression profiling of lung tissues of BLM-induced SSc model animals to which "Compound A or the like" was administered, which profiling was carried out using a microarray. This diagram shows a pathway map of IL-6 signaling. Changes in PBS vs. BLM group (left), and BLM vs. Compound A group (right).

With respect to IL-6 signaling, the changes in gene expression of each gene constituting the IL-6 signal pathway are shown in FIG. 3E and are visualized on the pathway map (FIG. 3F). Compound A reversed the gene expression fluctuation induced by BLM, regardless of whether the related genes were upstream (involved in the expression of IL-6) or downstream (genes responding to IL-6) in the IL-6 pathway (FIGS. 3E and F). Among the component genes of the IL-6 signaling pathway, expression of the IL-6 gene itself was remarkably upregulated by BLM and was downregulated the most by Compound A (FIGS. 3E and F).

Biomarker Analysis of Compound a by Serum Protein Profiling

Figure 4:
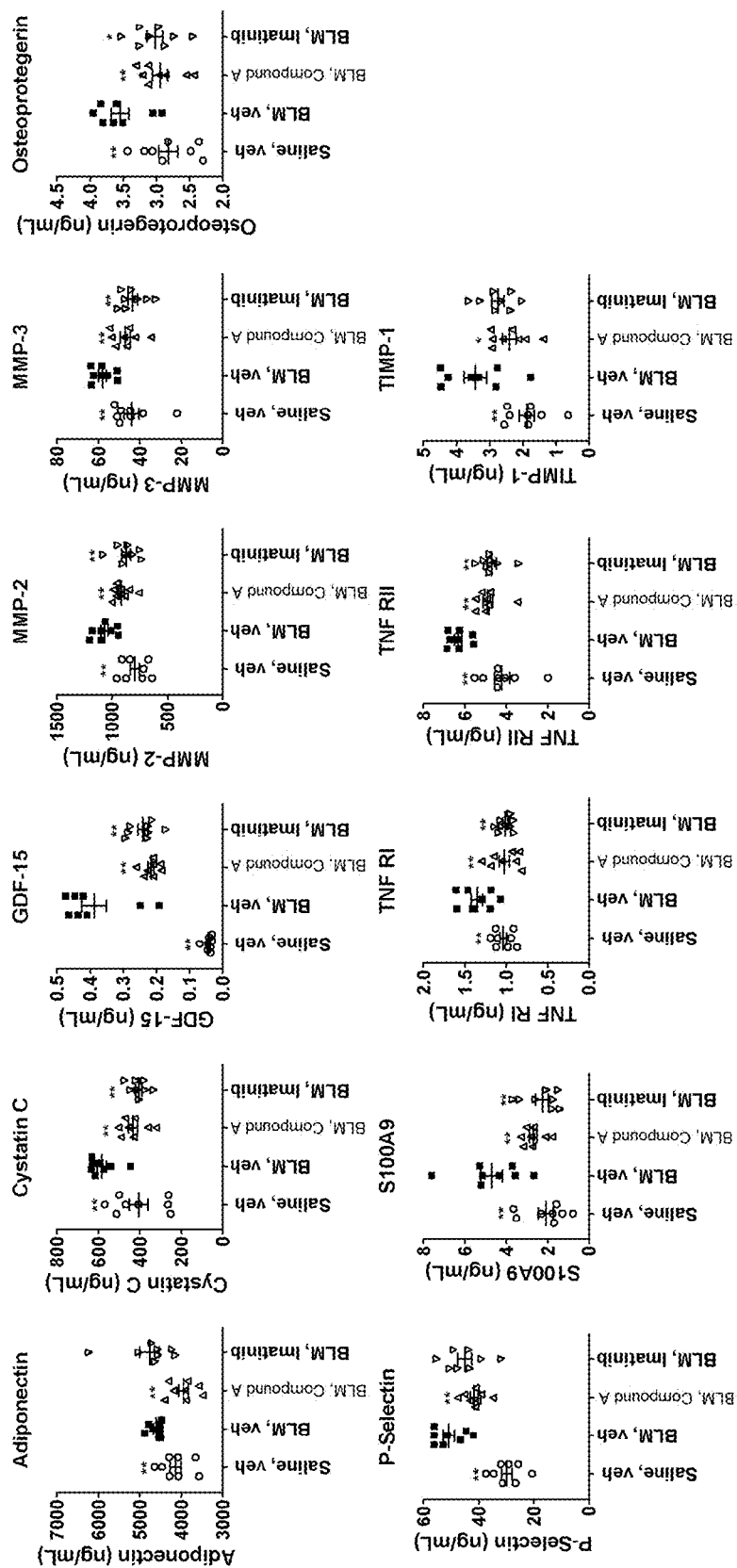
FIG. 4 shows serum protein profiling in BLM-induced SSc model animals to which Compound A was administered.

FIG. 4 shows serum protein profiling in BLM-induced SSc model animals to which Compound A was administered. Using serum samples of mice to which 10 mg/kg of Compound A and 150 mg/kg of imatinib were administered, serum protein profiling was carried out in a BLM-induced SSc model (treatment model). Using a Luminex assay, 110 kinds of proteins were investigated. The graphs show 11 kinds of proteins significantly suppressed by the Compound A treatment. The graphs include plotted dots of individual values with the mean±SEM (n=8). * $p<0.05$, ** $p<0.01$; according to Student's t-test (vs. BLM_vehicle group).

For exploring a serum biomarker of Compound A, serum protein profiling was performed using serum samples obtained from the BLM-induced SSc model (therapeutic evaluation). A total of 110 serum protein profiles were investigated by Luminex assay (the measured factors are listed in supplemental materials, Table s1). Of the 110 proteins measured, 67 met the criteria for analysis as described in the Material and Methods. The concentrations of adiponectin, cystatin C, growth and differentiation factor-15 (GDF-15), matrix metalloproteinase (MMP)-2, MMP-3, osteoprotegerin, P-selectin, S100A9, tumor necrosis factor receptor I (TNFRI), TNFRII, and tissue inhibitor of metalloproteinases-1 (TIMP-1) were significantly elevated by BLM, and Compound A significantly suppressed these elevations (FIG. 4).

Effect of Compound a on Human Fibroblast Activation

Figure 5A:
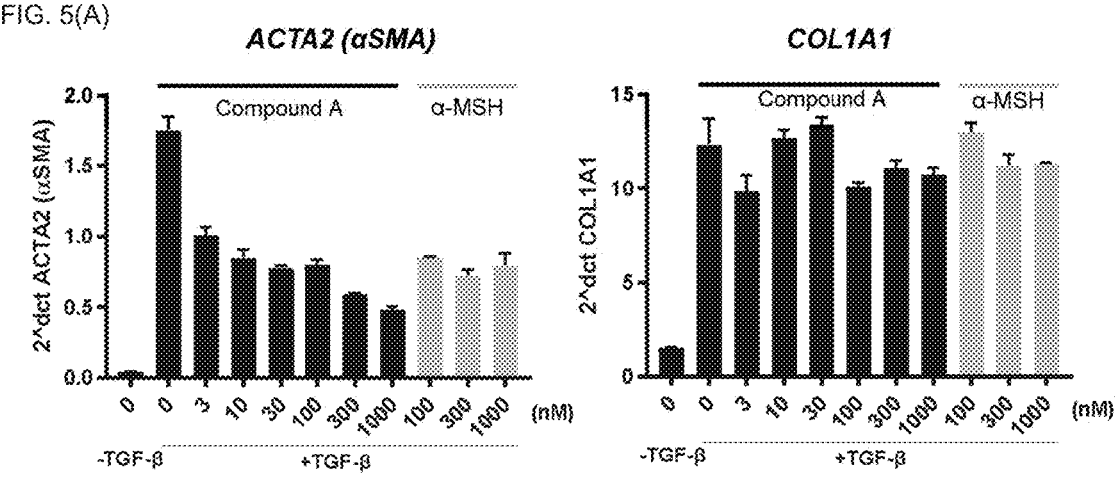
FIGS. 5(A)-5(B) show the effect of Compound A on human fibroblast activation. Dermal fibroblasts from a healthy individual or an SSc patient were grown to confluence, and placed under starvation for 24 hours in a medium supplemented with 1% fetal bovine serum.
Figure 5B:
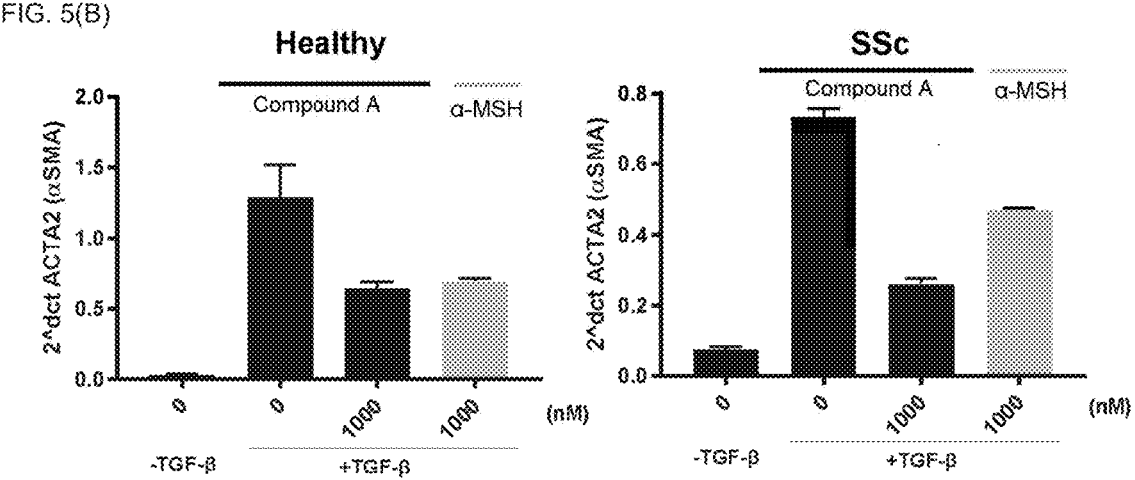
Figure 7:
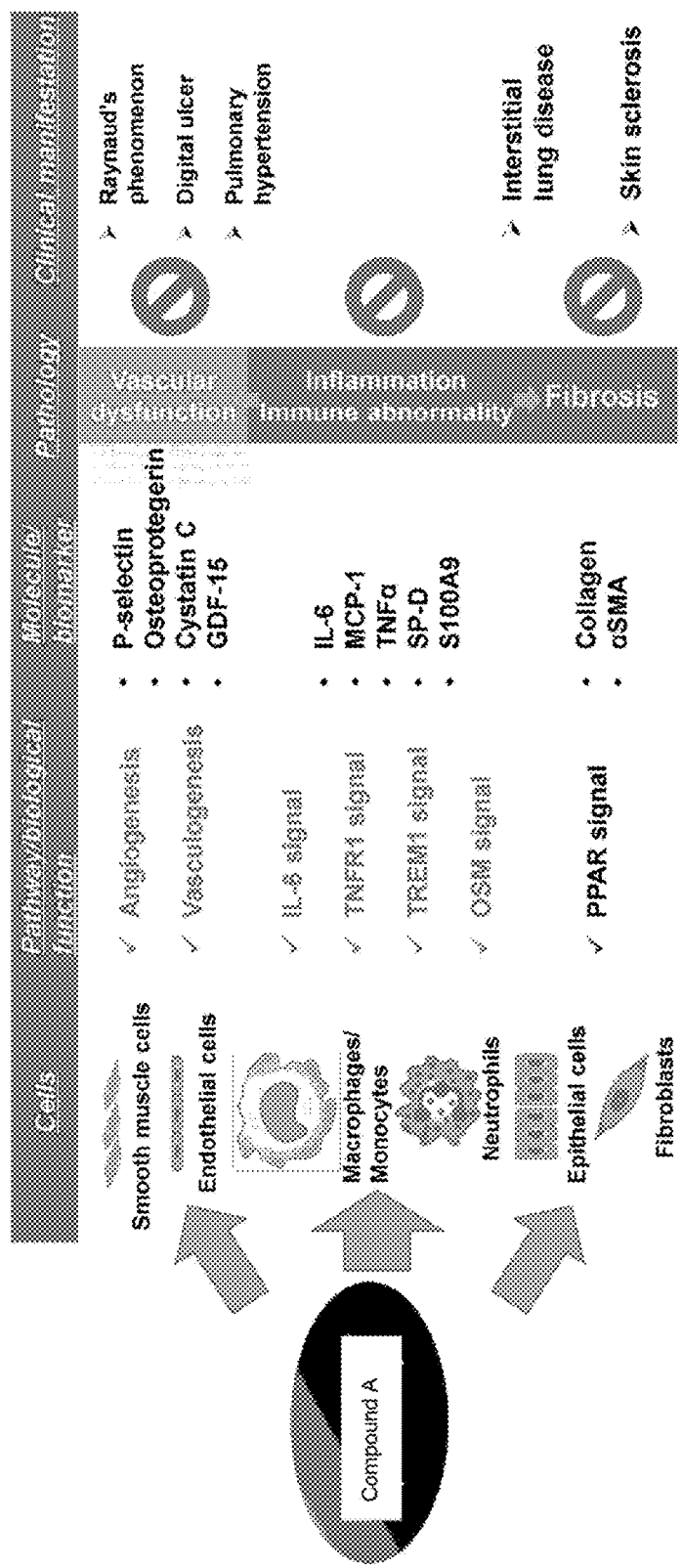
FIG. 7 is a schematic diagram of the action mechanism of Compound A in systemic sclerosis.

FIGS. 5(A)-5(B) show the effect of Compound A on human fibroblast activation. Dermal fibroblasts from a healthy individual or an SSc patient were grown to confluence, and placed under starvation for 24 hours in a medium supplemented with 1% fetal bovine serum (A: mRNA expression of ACTA2 and COL1A1 in dermal fibroblasts of healthy individuals was measured by real-time PCR, and normalized for the GAPDH expression level. B: mRNA expression of ACTA2 and COL1A1 in dermal fibroblasts of SSc patients was measured for by real-time PCR, and normalized for the GAPDH expression level). Each bar represents the mean±SEM of the measured values from three wells. The results shown represent two or three independent experiments in which similar results were obtained. Thereafter, the cells were stimulated with TGF-β (10 ng/mL) in the presence of Compound A or α-MSH for 24 hours.

To assess the anti-fibrotic effect of Compound A on skin fibroblasts, the effects of Compound A on ACTA2 and collagen mRNA expression induced by TGF-β stimulation were evaluated next. After 24-hour culture in TGF-3-containing medium following 24 hour of starvation, a marked increase in ACTA2 and COL1A1 mRNA expression was demonstrated. Compound A inhibited the TGF-β-induced αSMA mRNA elevation in a concentration-dependent manner but had no effect on COL1A1 mRNA expression (FIG. 5A). However, it was presumed that it has an inhibitory effect at protein level. A similar tendency was observed with treatment using α-MSH, an endogenous ligand for MC1R. Furthermore, the effects of Compound A and α-MSH on dermal fibroblasts from patients with SSc were evaluated. Compound A and α-MSH suppressed the TGF-β-induced increase in αSMA mRNA expression at concentration of 1000 nmol/L in fibroblasts from SSc patients as well as fibroblasts from healthy donors (FIG. 5B). These results suggest that Compound A has an anti-fibrotic effect by suppressing TGF-β-induced fibroblast activation.

Analysis of Compound a Targets by Immunostaining of MC1R in Human Skin

FIGS. 6(A)-6(B) show analysis (photographs) of MC1R in skin biopsy samples from SSc patients, which analysis was carried out by immunohistochemical staining. Representative images by immunohistochemical staining of skin biopsy samples from patients with dcSSc (diffuse cutaneous systemic sclerosis) (A: Single staining using an anti-MC1R antibody. Visualization with DAB substrate, and counterstaining with hematoxylin. Left: Low magnification (×40). Right: High magnification (×100). Black arrows: Fibroblasts/mononuclear cells. Grey arrows: Endothelial cells. B: Double immunofluorescence staining with an anti-MC1R antibody and cell-specific markers. Merged images for MC1R and each cell marker. CD68: Monocytes/macrophages; Propyl-4-hydroxylase β (P4Hβ): Fibroblasts; CD31: Endothelial cells; CD66b: Neutrophils. Circles: Areas showing coexistence).

Immunohistochemical analysis was performed to examine the presence of MC1R in skin biopsies of healthy donors and SSc patients. The characteristics of the donors are shown in Table 1. Single staining showed that MC1R immunoreactivity was mainly observed in the fibroblasts/mononuclear cells, blood vessels, and epidermis of the skin from patients with dcSSc (FIG. 6A). For the purpose of qualitative evaluation, MC1R immunoreactivity was separately scored in four categories: total field, vessels, epidermis, and fibroblast/mononuclear cells (fibroblasts and monocytes were analyzed without distinction because they were indistinguishable by single staining). MC1R positivity was observed in 24 of 30 healthy donors, 40 of 50 dcSSc patients, and 9 of 10 lcSSc patients. MC1R score for staining intensity was similar across healthy, dcSSc, and lcSSc patients in all categories of tissue elements (Table 2). Furthermore, there was no apparent correlation between MC1R score and modified Rodnan skin score (mRSS) in all categories of tissue elements. These results indicate MC1R expression was frequently observed in SSc patients regardless of disease activity.

To determine the cell type of MC1R-positive cells in patients with dcSSc, a double-staining protocol that co-stained MC1R with cell-specific markers was used. MC1R-positive cells were mainly monocytes/macrophages and there was staining of fibroblasts, endothelial cells, and neutrophils to a lesser extent (FIG. 6B).

TABLE 1

Clinical Characteristics of SSc Patients in
the Cutaneous Immunohistochemical Analysis

| Clinical information | Healthy | dcSSc | lcSSc |
|---|---|---|---|
| Total number | 30 | 50 | 10 |
| Sex (female:male) | 21:9 (70%:30%) | 35:15 (70%:30%) | 8:2 (80%:20%) |
| Race | Caucasian (100%) | Caucasian (100%) | Caucasian (100%) |
| Age (years)* | 46.7 ± 13.3 | 45.5 ± 11.9 | 61.2 ± 9.4 |
| mRSS* | — | 19.1 ± 4.4 | 8.1 ± 1.9 |
| Disease duration (years)* | — | 3.2 ± 2.2 | 7.7 ± 3.8 |
| DMARD therapy | — | 12 (24%) | 1 (10%) |
| CRP elevation | — | 18 (36%) | 0 (0%) |
| Anti-Scl-70 | — | 15 (30%) | 0 (0%) |

Values are expressed as absolute number (%) unless otherwise indicated.
*Values expressed as mean ± SEM
Abbreviations:
dcSSc = diffuse cutaneous systemic sclerosis;
lcSSc = limited cutaneous systemic sclerosis;
mRSS = modified Rodnan skin score;
DMARD = disease-modifying anti-rheumatic drug;
CRP = C-reactive protein;
Anti-Scl-70 = anti-topoisomerase I antibodies

TABLE 2

Scores of Melanocortin-1 Receptor (MC1R)
Immunostaining of Skin Sections

| IHC (MC1R staining) evaluation | Healthy | dcSSc | lcSSc |
|---|---|---|---|
| Total score | 0.83 ± 0.13 | 0.94 ± 0.11 | 0.65 ± 0.17 |
| Vessel score | 0.70 ± 0.13 | 0.68 ± 0.08 | 0.75 ± 0.15 |
| Fibroblast/mononuclear cells score | 0.70 ± 0.12 | 0.89 ± 0.10 | 0.65 ± 0.17 |
| Epidermis score | 0.85 ± 0.17 | 0.83 ± 0.15 | 0.60 ± 0.19 |
| Positive rate of MC1R expression* | 24/30 (80%) | 40/50 (80%) | 9/10 (90%) |

Scores are expressed as mean ± SEM (no staining, 0; faint staining, 0.5; light staining, 1; moderate staining, 2; dark staining, 3)
*Values are expressed as an absolute number (%). MC1R positivity was defined as a total score of 0.5 or higher (faint staining)
Abbreviations:
IHC = immunohistochemistry;
MC1R = melanocortin 1 receptor Systemic sclerosis is an autoimmune disease characterized in that it exhibits, as major pathological conditions, impairment of the control of immunity and inflammation, microvasculopathy, and multiorgan fibrosis. Among the autoimmune rheumatic diseases, systemic sclerosis shows the highest cause-specific mortality, and can be said to be a disease with a high unmet medical need. As therapeutic agents for interstitial lung disease associated with systemic sclerosis, nintedanib (trade name, Ofev) and tocilizumab (trade name, Actemra) have so far been known. However, a drug having higher effectiveness and safety is desired. Furthermore, there is no approved drug for systemic sclerosis itself, and the necessity of therapeutic agents for systemic sclerosis-associated symptoms other than interstitial lung disease has also been pointed out.

The melanocortin receptor (MCR) family belongs to the class A family of G protein-coupled receptors, and constituted by five members with different tissue distributions and functions (MC1R, MC2R, MC3R, MC4R, and MC5R). MC1R has been reported to be expressed in various cell types such as melanocytes, monocytes, endothelial cells, fibroblasts, and keratinocytes. Activation of MC1R by α-melanocyte-stimulating hormone (α-MSH), which is an endogenous ligand, induces melanin production in melanocytes, causing pigmentation in the skin and hair. Further, activation of MC1R has a wide range of anti-inflammatory actions. In relation to systemic sclerosis, α-MSH has been reported to suppress skin fibrosis in a bleomycin (BLM)-induced skin fibrosis model, which is the most widely used systemic sclerosis animal model, and MC1R signal-deficient mouse has been reported to have enhanced BLM-induced skin fibrosis. Such evidence suggests that MC1R agonism may be effective for treatment of systemic sclerosis, but details of its action mechanism are unknown. Furthermore, information related to the expression level and the distribution of MC1R in patients with systemic sclerosis has not been sufficiently understood, and how the expression level and the distribution are associated with systemic sclerosis and its related diseases is unclear.

WO 2015/182723 describes that pyrrolidine compounds such as 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, and pharmaceutically acceptable salts, solvates/hydrates, and co-crystals thereof have excellent MCR-activating action, especially MC1R-activating action. WO 2020/138481 describes that a co-crystal of Compound A and phosphoric acid has excellent MCR-activating action, especially MC1R-activating action. WO 2015/182723 and WO 2020/138481 respectively describe that Compound A, or co-crystals of Compound A and phosphoric acid are useful for prevention or treatment of diseases and symptoms associated with activation of MCR, especially MC1R, and the documents also describe systemic sclerosis as a target disease. However, no effect is known for interstitial lung disease, or for a disease or symptom accompanied by systemic sclerosis, such as skin fibrosis, flexion contracture, gastroesophageal reflux disease, dysphagia, Raynaud phenomenon, digital ulcers, pulmonary hypertension, or renal crisis.

By administering Compound A, which is an MC1R agonist, or a pharmaceutically acceptable salt or co-crystal thereof to a systemic sclerosis model animal, the expression levels of disease-related markers such as P-selectin, osteoprotegerin, cystatin C, GDF-15 (growth and differentiation factor-15), ET-1 (endothelin-1), IL-6, CCL2 (chemokine (C—C motif) ligand 2) (another name, MCP-1: monocyte chemoattractant protein 1), TNFR (tumor necrosis factor receptor) I, TNFRII, SP-D (surfactant protein D), S100A9 (S100 calcium binding protein A9), adiponectin, MMP (matrix metalloproteinase)-2, MMP-3, TIMP-1 (tissue inhibitor of metalloproteinases-1), collagen, and α-SMA (alpha smooth muscle actin, encoded by the Acta2 gene) can be decreased. Thereby, MC1R agonists such as Compound A are found to be effective for treatment and prevention of interstitial lung disease, and of diseases and symptoms accompanied by systemic sclerosis, selected from skin fibrosis, flexion contracture, gastroesophageal reflux disease, dysphagia, Raynaud phenomenon, digital ulcers, pulmonary hypertension, and renal crisis.

A medicament for treatment or prevention of interstitial lung disease (ILD) in a subject according to an embodiment of the present invention includes, as an effective ingredient, 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof.

Embodiments of the present invention include 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof for use in treatment or prevention of interstitial lung disease in a subject.

Embodiments of the present invention include use of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof in manufacture of a medicament for treatment or prevention of interstitial lung disease in a subject.

A method of treating or preventing interstitial lung disease in a subject according to an embodiment of the present invention includes administering an effective amount of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof.

In the medicament, the use, or the method, the interstitial lung disease may be idiopathic interstitial pneumonia, or connective tissue disease (CTD)-associated interstitial lung disease.

In the medicament, the use, or the method, the interstitial lung disease may be systemic sclerosis-associated interstitial lung disease.

In the medicament, the use, or the method, the systemic sclerosis (SSc) may be diffuse cutaneous systemic sclerosis (dcSSc).

In the medicament, the use, or the method, the subject may be a patient whose expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA is increased compared to the expression level in a healthy individual.

A medicament for treatment or prevention of a disease or symptom accompanied by systemic sclerosis in a subject according to an embodiment of the present invention includes, as an effective ingredient, 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof. The disease or symptom is at least one selected from skin fibrosis, flexion contracture, gastroesophageal reflux disease, dysphagia, Raynaud phenomenon, digital ulcers, pulmonary hypertension, and renal crisis.

Embodiments of the present invention include 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof for use in treatment or prevention of a disease or symptom accompanied by systemic sclerosis in a subject. The disease or symptom is at least one selected from skin fibrosis, flexion contracture, gastroesophageal reflux disease, dysphagia, Raynaud phenomenon, digital ulcers, pulmonary hypertension, and renal crisis.

Embodiments of the present invention include use of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof in manufacture of a medicament for treatment or prevention of a disease or symptom accompanied by systemic sclerosis in a subject, the disease or symptom being at least one selected from skin fibrosis, flexion contracture, gastroesophageal reflux disease, dysphagia, Raynaud phenomenon, digital ulcers, pulmonary hypertension, and renal crisis.

A method of treating or preventing a disease or symptom accompanied by systemic sclerosis in a subject according to an embodiment of the present invention includes administering an effective amount of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof. The disease or symptom is at least one selected from skin fibrosis, flexion contracture, gastroesophageal reflux disease, dysphagia, Raynaud phenomenon, digital ulcers, pulmonary hypertension, and renal crisis.

In the medicament, the use, or the method, the subject may be a patient with diffuse cutaneous systemic sclerosis.

In the medicament, the use, or the method, the subject may be a patient whose expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA is increased compared to the expression level in a healthy individual.

A medicament for decreasing the expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA in a subject according to an embodiment of the present invention includes, as an effective ingredient, 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof.

Embodiments of the present invention include 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof for use in decreasing the expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA in a subject.

Embodiments of the present invention include use of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof in manufacture of a medicament for decreasing the expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA in a subject.[9-3]A method of decreasing the expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA in a subject. The use includes administering an effective amount of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof.

In the medicament, the use, or the method, the subject may be a subject having interstitial lung disease.

In the medicament, the use, or the method, the interstitial lung disease may be idiopathic interstitial pneumonia, or connective tissue disease-associated interstitial lung disease.

In the medicament, the use, or the method, the interstitial lung disease may be systemic sclerosis-associated interstitial lung disease.

In the medicament, the use, or the method, the subject may be a subject having a disease or symptom accompanied by systemic sclerosis, the disease or symptom being at least one selected from skin fibrosis, flexion contracture, gastroesophageal reflux disease, dysphagia, Raynaud phenomenon, digital ulcers, pulmonary hypertension, and renal crisis.

A medicament for treatment or prevention of a disease or symptom accompanied by systemic sclerosis according to an embodiment of the present invention includes, as an effective ingredient, an MC1R agonist such as α-MSH or an analog thereof. The disease or symptom is a disease or symptom selected from Raynaud phenomenon, digital ulcers, pulmonary hypertension, renal crisis, interstitial lung disease, skin fibrosis, flexion contracture, gastroesophageal reflux disease, and dysphagia.

Embodiments of the present invention include an MC1R agonist such as α-MSH or an analog thereof for use in treatment or prevention of a disease or symptom accompanied by systemic sclerosis. The disease or symptom is a disease or symptom selected from Raynaud phenomenon, digital ulcers, pulmonary hypertension, renal crisis, interstitial lung disease, skin fibrosis, flexion contracture, gastroesophageal reflux disease, and dysphagia.

Embodiments of the present invention include use of an MC1R agonist such as α-MSH or an analog thereof in manufacture of a medicament for treatment or prevention of a disease or symptom accompanied by systemic sclerosis. The disease or symptom is a disease or symptom selected from Raynaud phenomenon, digital ulcers, pulmonary hypertension, renal crisis, interstitial lung disease, skin fibrosis, flexion contracture, gastroesophageal reflux disease, and dysphagia.

A method of treating or preventing a disease or symptom accompanied by systemic sclerosis according to an embodiment of the present invention includes administering an effective amount of an MC1R agonist such as α-MSH or an analog thereof to a subject in need thereof. The disease or symptom is a disease or symptom selected from Raynaud phenomenon, digital ulcers, pulmonary hypertension, renal crisis, interstitial lung disease, skin fibrosis, flexion contracture, gastroesophageal reflux disease, and dysphagia.

A method of determining therapeutic effectiveness of an MC1R agonist for a patient with systemic sclerosis according to an embodiment of the present invention includes measuring the expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA in a sample from the patient with systemic sclerosis.

In the method, the patient with systemic sclerosis may have at least one disease or symptom selected from Raynaud phenomenon, digital ulcers, pulmonary hypertension, renal crisis, interstitial lung disease, skin fibrosis, flexion contracture, gastroesophageal reflux disease, and dysphagia.

In the method, the MC1R agonist may be 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof.

A method of determining whether or not an MC1R agonist can be administered to a patient with systemic sclerosis according to an embodiment of the present invention includes measuring the expression level of at least one marker selected from P-selectin, osteoprotegerin, cystatin C, GDF-15, ET-1, IL-6, CCL2 (MCP-1), TNFRI, TNFRII, SP-D, S100A9, adiponectin, MMP-2, MMP-3, TIMP-1, collagen, and α-SMA in a sample from the patient with systemic sclerosis.

In the method, the patient with systemic sclerosis may have at least one disease or symptom selected from Raynaud phenomenon, digital ulcers, pulmonary hypertension, renal crisis, interstitial lung disease, skin fibrosis, flexion contracture, gastroesophageal reflux disease, and dysphagia.

In the method, the MC1R agonist may be 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof.

A medicament according to an embodiment of the present invention enables effective treatment or prevention of interstitial lung disease, for example, idiopathic interstitial pneumonia, connective tissue disease-associated interstitial lung disease, or systemic sclerosis-associated interstitial lung disease. A medicament according to an embodiment of the present invention also enables effective treatment or prevention of skin fibrosis, flexion contracture, gastroesophageal reflux disease, dysphagia, Raynaud phenomenon, digital ulcers, pulmonary hypertension, or renal crisis that occur in patients with systemic sclerosis.

Obviously, numerous modifications and variations of the present invention are possible in light of the above teachings. It is therefore to be understood that within the scope of the appended claims, the invention may be practiced otherwise than as specifically described herein.

What is claimed is:

1. A method for treating systemic sclerosis-associated interstitial lung disease, comprising:
administering an effective amount of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof to a subject in need thereof.

2. The method according to claim 1, wherein systemic sclerosis of the systemic sclerosis-associated interstitial lung disease is diffuse cutaneous systemic sclerosis.

3. The method according to claim 1, wherein the subject is a patient whose expression level of at least one marker selected from P-selectin, osteoprotegerin, cystatin C, GDF-15, IL-6, CCL2 (MCP-1), TNFRI, TNFRII, SP-D, S100A9, adiponectin, MMP-2, MMP-3, TIMP-1, collagen, and α-SMA is increased compared to the expression level in a healthy individual.

4. The method according to claim 3, wherein the expression level of the at least one marker is increased not less than 1.5-fold compared to the expression level in the healthy individual.

5. The method according to claim 3, wherein the expression level of the at least one marker is increased not less than 1.8-fold compared to the expression level in the healthy individual.

6. The method according to claim 3, wherein the expression level of the at least one marker is increased not less than 2.0-fold compared to the expression level in the healthy individual.

7. The method according to claim 1, wherein systemic sclerosis of the systemic sclerosis-associated interstitial lung disease is limited cutaneous systemic sclerosis.

8. The method according to claim 1, wherein about 0.0001 to 1000 mg of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof per day is parenterally administered to the subject in need thereof.

9. The method according to claim 1, wherein about 0.001 to 1000 mg of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof per day is parenterally administered to the subject in need thereof.

10. The method according to claim 1, wherein about 0.01 to 500 mg of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof per day is parenterally administered to the subject in need thereof.

11. The method according to claim 1, wherein about 100 to 300 mg of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof per day is parenterally administered to the subject in need thereof.

12. The method according to claim 1, wherein about 0.0001 to 1000 mg of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof per day is orally administered to the subject in need thereof.

13. The method according to claim 1, wherein about 0.01 to 500 mg of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof per day is orally administered to the subject in need thereof.

14. The method according to claim 1, wherein about 100 to 300 mg of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof per day is orally administered to the subject in need thereof.

15. The method according to claim 2, wherein the subject is a patient whose expression level of at least one marker selected from P-selectin, osteoprotegerin, cystatin C, GDF-15, IL-6, CCL2 (MCP-1), TNFRI, TNFRII, SP-D, S100A9, adiponectin, MMP-2, MMP-3, TIMP-1, collagen, and α-SMA is increased compared to a expression level in a healthy individual.

16. The method according to claim 15, wherein the expression level of the at least one marker is increased not less than 1.5-fold compared to the expression level in the healthy individual.

17. The method according to claim 15, wherein the expression level of the at least one marker is increased not less than 1.8-fold compared to the expression level in the healthy individual.

18. The method according to claim 15, wherein the expression level of the at least one marker is increased not less than 2.0-fold compared to the expression level in the healthy individual.

19. The method according to claim 2, wherein about 0.0001 to 1000 mg of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof per day is parenterally administered to the subject in need thereof.

20. The method according to claim 2, wherein about 0.0001 to 1000 mg of 1-{2-[(3S,4R)-1-{[(3R,4R)-1-cyclopentyl-3-fluoro-4-(4-methoxyphenyl)pyrrolidin-3-yl]carbonyl}-4-(methoxymethyl)pyrrolidin-3-yl]-5-(trifluoromethyl)phenyl}piperidine-4-carboxylic acid, or a pharmaceutically acceptable salt or co-crystal thereof per day is orally administered to the subject in need thereof.

* * * * *

SEQUENCE LISTING

```
Sequence total quantity: 6
SEQ ID NO: 1            moltype = DNA  length = 23
FEATURE                 Location/Qualifiers
misc_feature            1..23
                        note = GAPDH-F
source                  1..23
                        mol_type = other DNA
                        organism = synthetic construct
SEQUENCE: 1
acccactcct ccaccacctt tga                                             23
```

```
SEQ ID NO: 2              moltype = DNA   length = 22
FEATURE                   Location/Qualifiers
misc_feature              1..22
                          note = GAPDH-R
source                    1..22
                          mol_type = other DNA
                          organism = synthetic construct
SEQUENCE: 2
ctgttgctgt agccaaattc gt                                            22

SEQ ID NO: 3              moltype = DNA   length = 20
FEATURE                   Location/Qualifiers
misc_feature              1..20
                          note = ACTA2-F
source                    1..20
                          mol_type = other DNA
                          organism = synthetic construct
SEQUENCE: 3
tgtatgtggc tatccaggcg                                               20

SEQ ID NO: 4              moltype = DNA   length = 20
FEATURE                   Location/Qualifiers
misc_feature              1..20
                          note = ACTA2-R
source                    1..20
                          mol_type = other DNA
                          organism = synthetic construct
SEQUENCE: 4
agagtccagc acgatgccag                                               20

SEQ ID NO: 5              moltype = DNA   length = 20
FEATURE                   Location/Qualifiers
misc_feature              1..20
                          note = COL1A1-F
source                    1..20
                          mol_type = other DNA
                          organism = synthetic construct
SEQUENCE: 5
gctccgaccc tgccgatgtg                                               20

SEQ ID NO: 6              moltype = DNA   length = 22
FEATURE                   Location/Qualifiers
misc_feature              1..22
                          note = COL1A1-R
source                    1..22
                          mol_type = other DNA
                          organism = synthetic construct
SEQUENCE: 6
catcaggcgc aggaaggtca gc                                            22
```